(12) United States Patent
Nagai et al.

(10) Patent No.: US 10,982,544 B2
(45) Date of Patent: Apr. 20, 2021

(54) TURBINE AND GAS TURBINE

(71) Applicant: MITSUBISHI HEAVY INDUSTRIES, LTD., Tokyo (JP)

(72) Inventors: Naonori Nagai, Tokyo (JP); Hiroyoshi Torikai, Tokyo (JP); Hiroshi Watanabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 248 days.

(21) Appl. No.: 16/316,519

(22) PCT Filed: Dec. 26, 2017

(86) PCT No.: PCT/JP2017/046634
§ 371 (c)(1),
(2) Date: Jan. 9, 2019

(87) PCT Pub. No.: WO2018/124068
PCT Pub. Date: Jul. 5, 2018

(65) Prior Publication Data
US 2019/0292910 A1    Sep. 26, 2019

(30) Foreign Application Priority Data

Dec. 26, 2016 (JP) .............................. JP2016-252008
Dec. 26, 2016 (JP) .............................. JP2016-252020

(51) Int. Cl.
*F01D 1/02* (2006.01)
*F01D 25/24* (2006.01)
(Continued)

(52) U.S. Cl.
CPC .............. *F01D 1/02* (2013.01); *F01D 25/24* (2013.01); *F01D 25/30* (2013.01); *F02C 7/00* (2013.01);
(Continued)

(58) Field of Classification Search
CPC . F01D 1/02; F01D 25/24; F01D 25/30; F02C 7/00; F05D 2220/32; F05D 2240/127
See application file for complete search history.

(56) References Cited

U.S. PATENT DOCUMENTS 10,539,157 B2 *  1/2020  Schilling ............... F04D 29/384
2013/0330183 A1  12/2013  Sparks
(Continued)

FOREIGN PATENT DOCUMENTS

| CN | 103459781 | 12/2013 |
| CN | 103485846 | 1/2014 |

(Continued)

OTHER PUBLICATIONS

International Search Report dated Apr. 3, 2018 in International (PCT) Application No. PCT/JP2017/046634, with English translation.

(Continued)

*Primary Examiner* — Aaron R Eastman
(74) *Attorney, Agent, or Firm* — Wenderoth, Lind & Ponack, L.L.P.

(57) ABSTRACT

A turbine includes a diffuser. The diffuser includes a combustor basket, an outer shell, a plurality of struts, and a protrusion. A front end of the protrusion is between a leading edge position of an adjacent pair of the struts and a trailing edge position of the adjacent pair of the struts, and a rear end of the protrusion extends further than the trailing edge position of the adjacent pair of the struts in an axial direction.

6 Claims, 13 Drawing Sheets

(51) Int. Cl.
*F01D 25/30* (2006.01)
*F02C 7/00* (2006.01)

(52) U.S. Cl.
CPC .... *F05D 2220/32* (2013.01); *F05D 2240/127* (2013.01)

(56) References Cited

U.S. PATENT DOCUMENTS

| | | | |
|---|---|---|---|
| 2014/0023493 A1 | 1/2014 | Kitagawa et al. | |
| 2014/0096500 A1* | 4/2014 | Chengappa | F01D 5/145 60/39.5 |
| 2016/0348537 A1* | 12/2016 | Akturk | F01D 5/143 |

FOREIGN PATENT DOCUMENTS

| | | |
|---|---|---|
| EP | 2672064 | 12/2013 |
| JP | 07-035702 | 7/1995 |
| JP | 2012-041821 | 3/2012 |
| JP | 2013-257137 | 12/2013 |
| JP | 5693315 | 4/2015 |

OTHER PUBLICATIONS

Written Opinion of the International Searching Authority dated Apr. 3, 2018 in International (PCT) Application No. PCT/JP2017/046634, with English translation.

\* cited by examiner

TURBINE AND GAS TURBINE

CROSS-REFERENCE TO RELATED APPLICATION

Priority is claimed from Japanese Patent Application No. 2016-252008, filed Dec. 26, 2016 and Japanese Patent Application No. 2016-252020, filed Dec. 26, 2016, the contents of which are incorporated herein by reference.

FIELD OF THE INVENTION

The present invention relates to a turbine and a gas turbine.

BACKGROUND ART

Generally, a gas turbine includes a compressor, a combustor and a turbine. The compressor compresses external air and generates high pressure air, and the combustor mixes and combusts the high pressure air generated by the compressor and a fuel and generates high temperature and high pressure combustion gas. The turbine is driven by the combustion gas generated by the combustor.

A diffuser is provided on a downstream side of the turbine (refer to, for example, Japanese Patent Publication No. 5693315). The diffuser includes a combustor basket, an outer shell, and a strut. The combustor basket is disposed on an inner circumferential side of the diffuser, and the outer shell covers the combustor basket from an outer circumferential side and forms an exhaust flow path between the combustor basket and the outer shell. A plurality of struts are provided at intervals in a circumferential direction and extend from an outer circumferential surface of the combustor basket in a radial direction of the turbine. The combustor basket and the outer shell are connected via these struts.

The exhaust flow path of the diffuser is formed such that an area of the flow path gradually increases from an upstream side toward a downstream side in a flowing direction of the combustion gas. The combustion gas (exhaust gas) which has driven the turbine is restored to a static pressure by passing through the exhaust flow path thus formed. Since a pressure ratio of the gas turbine substantially increases when performance of the diffuser improves, performance improvement of the diffuser contributes to improvement of efficiency in the entire gas turbine.

SUMMARY OF INVENTION

Technical Problem

A flow of the combustion gas discharged from the turbine includes an axial direction component and a swirling flow component (swirl component) swirling in the circumferential direction around an axis. Therefore, when the flow of the exhaust gas passes around the strut, form resistance is generated or flow separation occurs due to the struts. These form resistances and the flow separation are a factor which increases a pressure loss. This increase in the pressure loss may reduce a recovery amount of the static pressure in the diffuser and may reduce the efficiency of the entire gas turbine. In particular, the flow separation is a factor which increases the pressure loss. Also, when the turbine is under a partial load, an angle of a swirling flow (swirling angle) increases. Thus, the flow separation is more likely to occur in the struts, and the pressure loss may increase. The increase in these pressure losses reduces the recovery amount of the static pressure in the diffuser and reduces the efficiency of the entire gas turbine.

The present invention has been made in view of the above circumstances, and an object thereof is to provide a turbine and a gas turbine capable of improving performance by minimizing a pressure loss.

Solution to Problem

In order to solve the above-described problem, the following constitution is adopted.

According to a first aspect of the present invention, a turbine includes a turbine rotor which extends along an axis and is rotatable toward one side in a circumferential direction of the axis, a turbine casing which covers the turbine rotor from an outer circumferential side thereof, a plurality of turbine blades which are arranged on an outer circumferential surface of the turbine rotor in the circumferential direction of the axis and in which at least portions thereof on other side in a direction of the axis are curved from the one side toward the other side in the circumferential direction, a plurality of turbine vanes provided on an inner circumferential surface of the turbine casing to be adjacent to the turbine blades in the axial direction and arranged in the circumferential direction, and a diffuser which is provided on the other side of the turbine blade in the direction of the axis and forms an exhaust flow path through which an exhaust gas flows from the one side in the direction of the axis to the other side, wherein the diffuser comprises a combustor basket which extends along the axis, an outer shell which covers the combustor basket from the outer circumferential side and forms the exhaust flow path between the combustor basket and the outer shell, a plurality of struts which are disposed in the exhaust flow path at intervals in the circumferential direction, connect the combustor basket to the outer shell and are disposed at a front side in a rotation direction of the turbine rotor from an inner side toward an outer side in a radial direction, and a protrusion which is arranged between the struts adjacent to each other in the circumferential direction, protrudes from an outer circumferential surface of the combustor basket and extends in the direction of the axis, a front end of the protrusion on the one side in the direction of the axis is disposed between a leading edge of the strut on the one side in the direction of the axis and a trailing edge of the strut on the other side in the direction of the axis, and a rear end of the protrusion on the other side is disposed farther along in the direction of the axis on the other side than the trailing edge.

A fluid which has passed through the turbine blade often forms a swirling flow due to a flow pattern design of the turbine blade and the turbine vane. Also, when a flow velocity in the direction of the axis is relatively small, like in the case of a partial load, a swirling flow becomes larger than in the case of a rated load.

In general, when a structure is present in a flow of a fluid, a so-called horseshoe vortex is generated. In this horseshoe vortex, vortices generated on both sides of the structure become vortex tubes and extend to be wound around the structure.

For example, when the flow velocity in the direction of the axis is relatively small, like in the case of the partial load of the turbine, an angle (a swirling angle) of the swirling flow with respect to the axis increases. When the angle of the swirling flow with respect to the axis increases as described above, separation of the fluid occurs in a region in the vicinity of the leading edge of the strut on the other side in the direction of the axis. Due to this separation, a separation vortex (transverse vortex) having a vortex axis extending in a radial direction of the axis (hereinafter, simply referred to as "radial direction") is generated. This separation vortex winds up a boundary layer formed on the outer circumferential surface of the combustor basket between the adjacent struts in the circumferential direction toward the outer side in the radial direction. Further, this separation vortex also winds up the horseshoe vortex formed on the front side in the rotation direction of the strut toward the outer side in the radial direction. Due to such winding-up, the boundary layer formed on the outer circumferential surface of the combustor basket from a center of the strut to the leading edge of the strut in the direction of the axis becomes unstable, and thus separation may occur.

However, since the protrusions protruding from the outer circumferential surface of the combustor basket and extending in the direction of the axis are disposed between the adjacent struts in the circumferential direction, the protrusions serve as a boundary, and thus the separation vortex generated at the strut located on the rear side in the rotation direction among the adjacent struts in the circumferential direction can be suppressed from affecting such as winding up the horseshoe vortex generated on the rear side in the rotation direction of the strut located on the front side in the rotation direction. Accordingly, it is possible to minimize instability of the boundary layer formed on the outer circumferential surface of the combustor basket from the center of the strut to the trailing edge of the strut in the direction of the axis due to the horseshoe vortex formed on the rear side of the strut located on the front side in the rotation direction.

Further, when the separation vortex formed at the strut located on the rear side in the rotation direction is directed to the strut located on the front side in the rotation direction between the adjacent struts in the circumferential direction, some of the separation vortex crosses the protrusion. Therefore, a longitudinal vortex having a vortex axis along the protrusion extending in the direction of the axis is generated. The longitudinal vortex is a vortex tube which rotates in the same direction as the rotation direction of the horseshoe vortex formed on the front side in the rotation direction of the strut and extends to a downstream side of the strut. In this way, since the rotation directions of the longitudinal vortex and the horseshoe vortex are the same, forces are applied to the longitudinal vortex and the horseshoe vortex in directions away from each other in the circumferential direction. That is, arrangement of the longitudinal vortex and the horseshoe vortex is easily maintained. Therefore, even downstream from the strut, the longitudinal vortex and the horseshoe vortex are easily maintained, and development of a boundary layer can be minimized.

As a result, even when the angle of the swirling flow is large, the separation of flow from the outer circumferential surface of the combustor basket can be minimized, a pressure loss in the exhaust flow path can be minimized, and thus performance can be improved.

According to a second aspect of the present invention, the protrusion according to the first aspect may be formed to be tapered toward the one side in the direction of the axis and may be formed to be tapered toward the other side in the direction of the axis when seen from an outer side in the radial direction of the axis.

With such a constitution, it is possible to reduce form resistance to a main flow of an exhaust gas flowing in the direction of the axis.

According to a third aspect of the present invention, the turbine according to the first aspect may include a convex portion which protrudes from a suction side of the strut.

With such a constitution, like the above-mentioned horseshoe vortex, a vortex can be formed on both sides of the convex portion. The vortex formed by the convex portion interferes with the separation vortex formed on the suction side of the strut due to the swirling flow. Therefore, it is possible to minimize the development of the separation vortex. That is, it is possible to reduce the winding-up of the boundary layer of the combustor basket due to the separation vortex.

According to a fourth aspect of the present invention, the convex portion according to the third aspect may be disposed on a side closer to the combustor basket than a center in the radial direction of the axis.

With such a constitution, a vortex interfering with the separation vortex can be formed by the convex portion particularly at a position closer to the combustor basket than the center in the radial direction in which the separation vortex is likely to be formed by the swirling flow. Therefore, generation of the separation vortex can be minimized efficiently.

According to a fifth aspect of the present invention, a gas turbine includes a compressor which generates compressed air obtained by compressing air, a combustor which mixes a fuel with the compressed air and generates a combustion gas, and the turbine which is described in any one of the first to fourth aspects and driven by the combustion gas.

With such a constitution, since pressure recovery in the diffuser of the turbine can be performed efficiently, the performance can be improved.

According to a sixth aspect of the present invention, the diffuser may be a diffuser provided on a downstream side of the turbine which rotates around the axis and may include a combustor basket which extends along the axis, an outer shell which covers the combustor basket from the outer circumferential side and forms an exhaust flow path between the combustor basket and the outer shell, a plurality of struts which are provided in the exhaust flow path at intervals in the circumferential direction, connect the combustor basket to the outer shell and extend toward the front side in the rotation direction of the turbine from an inner side to an outer side in the radial direction, and a convex portion which is formed on an outer circumferential surface of the combustor basket, disposed at a center between a pair of struts adjacent to each other in the circumferential direction and disposed within a region of ±10% of an entire length of the strut in the direction of the axis with reference to a position of the leading edge of the strut on one side in the direction of the axis.

In the diffuser, a flow between the adjacent struts in the circumferential direction around the axis generally forms a boundary layer on the outer circumferential surface of the combustor basket. Since the diffuser flow is a reverse pressure gradient, momentum tends to decrease in a boundary layer flow. Therefore, when a separation region due to local momentum loss is generated, the separation may proceed downstream of the flow, and a scale thereof may be large.

Generally, on the upstream side of the strut, disturbance occurs in the boundary layer due to inflow of a seal gas from a gap between a rotary body and the diffuser, and the boundary layer becomes unstable. Further, vorticity in a direction perpendicular to a flowing direction increases. Since the convex portion is disposed in the boundary layer, a fluid in the boundary layer is wound around the convex portion, and the longitudinal vortex having the vortex axis in the flowing direction of the fluid is formed on both sides of the convex portion in the circumferential direction. This longitudinal vortex extends downstream from the convex portion and forms a vortex tube (the horseshoe vortex). Thus, since a stable longitudinal vortex can be generated on the outer circumferential surface of the combustor basket, it is possible to minimize the occurrence of the separation due to the development of the boundary layer by providing momentum to the fluid in the boundary layer due to the longitudinal vortex. As a result, the pressure loss can be minimized, and the performance can be improved.

According to a seventh aspect of the present invention, the diffuser according to the sixth aspect may include a guide plate which extends in the direction of the axis at an interval on the downstream side of the convex portion.

With such a constitution, the longitudinal vortex formed by the convex portion can be maintained on the downstream side, and the disturbance of the longitudinal vortex can be regulated (rectified).

According to an eighth aspect of the present invention, the convex portion according to the sixth aspect may be disposed within a region of ±5% of the entire length of the strut in the direction of the axis with reference to the position of the leading edge of the strut on one side in the axial direction.

With such a constitution, it is possible to dispose the convex portion at a position closer to the position of the leading edge of the strut. Therefore, before the boundary layer develops, the longitudinal vortex can be generated by the convex portion, and the momentum can be provided to the fluid in the boundary layer. As a result, the development of the boundary layer can be stably minimized.

According to a ninth aspect of the present invention, the convex portion according to one of the sixth to eighth aspects may be formed to be tapered toward the outer side in the radial direction of the axis.

With such a constitution, it is possible to minimize an increase in the form resistance to the main flow of the diffuser. As a result, the pressure loss can be reduced.

According to a tenth aspect of the present invention, the diffuser may be a diffuser provided on a downstream side of the turbine which rotates around the axis and may include a combustor basket which extends along the axis, an outer shell which covers the combustor basket from the outer circumferential side and forms an exhaust flow path between the combustor basket and the outer shell, a plurality of struts which are provided in the exhaust flow path at intervals in the circumferential direction, connect the combustor basket to the outer shell and extend toward the front side in the rotation direction of the turbine from an inner side to an outer side in the radial direction, and a convex guide portion which is formed on an outer circumferential surface of the combustor basket, disposed at a center between a pair of struts adjacent to each other in the circumferential direction and disposed from a region of ±10% of an entire length of the strut in the direction of the axis with reference to a position of the leading edge of the strut in the direction of the axis to the position of the trailing edge of the strut.

With such a constitution, the fluid in the boundary layer is wound around the guide convex portion on the side close to the leading edge of the strut, and the longitudinal vortex having the vortex axis in the flowing direction of the fluid is formed on both sides of the guide convex portion in the circumferential direction. This longitudinal vortex extends downstream of the guide convex portion and forms the vortex tube (the horseshoe vortex). As a result, the stable longitudinal vortex can be generated on the outer circumferential surface of the combustor basket. Further, since the guide convex portion continuously extends to the position of the trailing edge of the strut, the convex portion can serve as a guide plate. That is, due to the guide convex portion, it is possible to regulate (rectify) turbulence of the longitudinal vortex while maintaining the longitudinal vortex on the downstream side. As a result, the momentum can be provided to the fluid in the boundary layer by the longitudinal vortex, and it is possible to minimize the development of the boundary layer and thus the occurrence of the separation. As a result, the pressure loss can be minimized, and the performance can be improved.

According to an eleventh aspect of the present invention, a turbine includes a turbine rotor which extends along an axis and is rotatable toward one side in a circumferential direction of the axis, a turbine casing which covers the turbine rotor from an outer circumferential side, a plurality of turbine blades arranged on an outer circumferential surface of the turbine rotor in the circumferential direction of the axis, a plurality of turbine vanes provided on an inner circumferential surface of the turbine casing to be adjacent to the turbine blades in a direction of the axis and arranged in the circumferential direction, and the diffuser according to any one of the sixth to tenth aspects.

With such a constitution, since the separation of the fluid in the diffuser can be minimized, the pressure loss of the turbine can be minimized. As a result, kinetic energy of the exhaust gas discharged from the turbine can be efficiently converted into pressure energy.

According to a twelfth aspect of the present invention, a gas turbine includes a compressor which generates compressed air obtained by compressing air, a combustor which mixes a fuel with the compressed air and burns it to generate a combustion gas, and the turbine according to the eleventh aspect which is driven by the combustion gas.

With such a constitution, since the pressure loss of the turbine can be minimized, the performance of the gas turbine can be improved.

The above-described first aspect of the invention can also be explained as follows.

According to the first aspect of the present invention, a turbine includes a turbine rotor which extends along an axis and is rotatable toward one side in a circumferential direction of the axis, a turbine casing which covers the turbine rotor from an outer circumferential side thereof, a plurality of turbine blades which are arranged on an outer circumferential surface of the turbine rotor in the circumferential direction of the axis and in which at least portions thereof on other side in a direction of the axis are curved from the one side toward the other side in the circumferential direction, a plurality of turbine vanes provided on an inner circumferential surface of the turbine casing to be adjacent to the turbine blades in the axial direction and arranged in the circumferential direction, and a diffuser which is provided on the other side of the turbine blade in the direction of the axis and forms an exhaust flow path through which an exhaust gas flows from the one side in the direction of the axis to the other side, wherein the diffuser comprises a combustor basket which extends along the axis, an outer shell which covers the combustor basket from the outer circumferential side and forms the exhaust flow path between the combustor basket and the outer shell, a plurality of struts which are disposed in the exhaust flow path at intervals in the circumferential direction, connect the combustor basket to the outer shell and are disposed at a front side in a rotation direction of the turbine rotor from an inner side toward an outer side in a radial direction, and a protrusion which is arranged between the struts adjacent to each other in the circumferential direction, protrudes from an outer circumferential surface of the combustor basket and extends in the direction of the axis, a front end of the protrusion on the one side in the direction of the axis is disposed between a leading edge of the strut on the one side in the direction of the axis and a trailing edge of the strut on the other side in the direction of the axis, and a rear end of the protrusion on the other side is disposed farther along in the direction of the axis on the other side than the trailing edge.

The fluid which has passed through the turbine blade often forms a swirling flow due to a flow pattern design of the turbine blade and the turbine vane. Also, when a flow velocity in the direction of the axis is relatively small, like in the case of a partial load, and a swirling flow becomes larger than in the case of a rated load.

In general, when a structure is present in the flow of the fluid, a so-called horseshoe vortex is generated. The horseshoe vortex is a secondary flow in which the vorticity supplied from a velocity gradient at the boundary layer in the vicinity of a wall surface becomes a vortex tube and winds around a base of the structure and a vortex axis of the vortex tube extends toward the flowing direction.

For example, when the flow velocity of the turbine in the direction of the axis is relatively small, like in the case of the partial load of the turbine, an angle (a swirling angle) of the swirling flow with respect to the axis increases. When the angle of the swirling flow with respect to the axis increases as described above, separation of the fluid occurs in a region in the vicinity of the leading edge of the strut on the other side in the direction of the axis. Due to this separation, a separation vortex (transverse vortex) having a vortex axis extending in a radial direction of the axis (hereinafter, simply referred to as "radial direction") is generated. When the separation vortex interferes with the boundary layer formed on the outer circumferential surface of the combustor basket between the adjacent struts in the circumferential direction, the separation vortex acts to wind up a low flow velocity region of the boundary layer toward the outer side in the radial direction. As a result of the action of this separation vortex, a rotation axis of the horseshoe vortex formed on both sides of the strut is also influenced in a direction in which it is wound up toward the outer side in the radial direction as it goes downstream. Therefore, the rotation axis of the horseshoe vortex has an angle with respect to the flowing direction of the main flow. As a result, the horseshoe vortex acts in a direction in which it disturbs the main flow, and the boundary layer formed on the outer circumferential surface of the combustor basket from the center of the strut to the trailing edge of the strut in the direction of the axis becomes more unstable, and a separation state deteriorates.

However, since the protrusions protruding from the outer circumferential surface of the combustor basket and extending in the direction of the axis are disposed between the adjacent struts in the circumferential direction, the protrusions serve as a boundary, and thus the separation vortex developed from a tip of the blade on the suction side of the strut among the adjacent struts in the circumferential direction can be suppressed from affecting such as winding up the horseshoe vortex located on the downstream side of the suction side of the strut. Accordingly, due to a behavioral change of the horseshoe vortex located on the downstream side of a back side of the strut, it is possible to minimize instability of the boundary layer formed on the outer circumferential surface of the combustor basket from the center of the strut to the trailing edge of the strut in the direction of the axis.

Further, when the separation vortex formed on the suction side of the strut is directed toward the pressure side of the opposite strut between the adjacent struts in the circumferential direction, some of the separation vortex crosses the protrusion. At this time, a direction of the vortex axis of the separation vortex falls toward the main flow side, and a longitudinal vortex having a vortex axis along the protrusion extending in the direction of the axis is generated. This longitudinal vortex rotates in the same direction as the rotation direction of the horseshoe vortex on the pressure side of the opposite strut and becomes a vortex tube arrangement extending to the downstream side of the strut. In general, when equivalent vortices are adjacent to each other and rotate in the same direction, both of them show a behavior of separating from each other, but since the rotation directions of the longitudinal vortex and the horseshoe vortex are the same, as described above, forces act on the longitudinal vortex and the horseshoe vortex in directions away from each other in the circumferential direction. That is, the arrangement of the longitudinal vortex and the horseshoe vortex is maintained, and a direction of the vortex axis also easily maintains a shape along the wall surface. Therefore, the longitudinal vortices are disposed even downstream from the struts in the flowing direction along the wall surface, the momentum of the main flow portion is supplied near the wall surface, and thus the development of the boundary layer can be minimized.

As a result, even when the angle of the swirling flow is large, it is possible to minimize the separation of the flow from the outer circumferential surface of the combustor basket, and thus it is possible to minimize the pressure loss in the exhaust flow path and to improve the performance.

Advantageous Effects of Invention

According to the turbine and the gas turbine, it is possible to improve performance by minimizing a pressure loss.

DESCRIPTION OF EMBODIMENTS

First Embodiment

Next, a turbine and a gas turbine according to a first embodiment of the present invention will be described with reference to the drawings.

Figure 1:
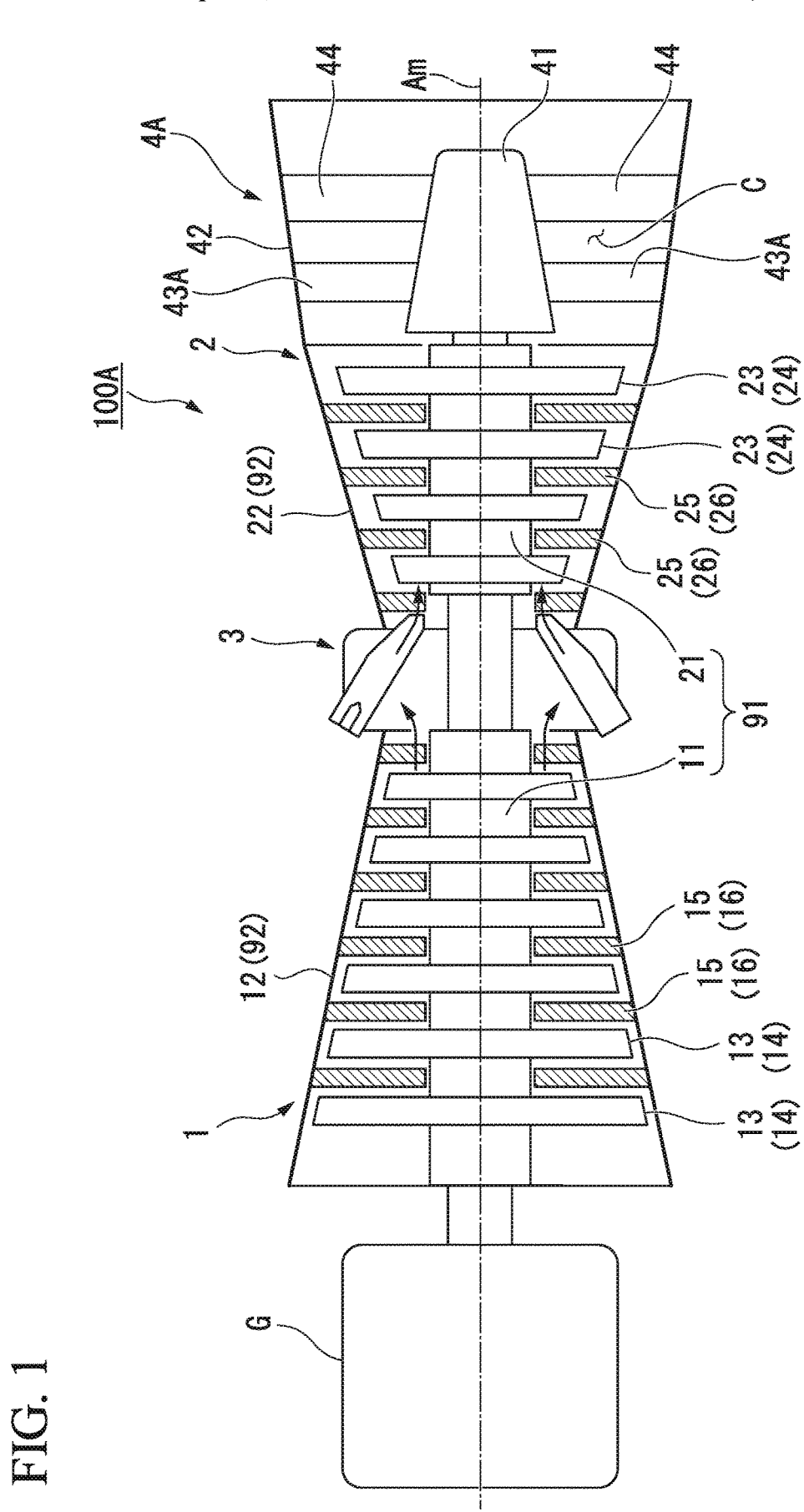
FIG. 1 is a constitution diagram showing a schematic constitution of a gas turbine according to a first embodiment of the present invention.

FIG. 1 is a constitution diagram showing a schematic constitution of a gas turbine according to a first embodiment of the present invention.

As shown in FIG. 1, a gas turbine 100A according to the first embodiment includes a compressor 1, a combustor 3, and a turbine 2.

The compressor 1 generates high pressure air. The compressor 1 includes a compressor rotor 11 and a compressor casing 12. The compressor casing 12 covers the compressor rotor 11 from an outer circumferential side and extends along an axis Am.

A plurality of compressor blade stages 13 arranged at intervals in a direction of the axis Am are provided on an outer circumferential surface of the compressor rotor 11. Each of the compressor blade stages 13 has a plurality of compressor blades 14. The compressor blades 14 of each of the compressor blade stages 13 are disposed on the outer circumferential surface of the compressor rotor 11 at intervals in a circumferential direction of the axis Am.

A plurality of compressor vane stages 15 arranged at intervals in the direction of the axis Am are provided on an inner circumferential surface of the compressor casing 12. These compressor vane stages 15 are disposed alternately with the compressor blade stages 13 in the direction of the axis Am. Each of the compressor vane stages 15 includes a plurality of compressor vanes 16. The compressor vanes 16 of each of the compressor vane stages 15 are arranged on the inner circumferential surface of the compressor casing 12 at intervals in the circumferential direction of the axis Am.

The combustor 3 generates a combustion gas by mixing the high pressure air generated by the compressor 1 with a fuel and burning it. The combustor 3 is provided between the compressor casing 12 and a turbine casing 22 of the turbine 2. The combustion gas generated by the combustor 3 is supplied to the turbine 2.

The turbine 2 is driven by the combustion gas generated by the combustor 3. The turbine 2 includes a turbine rotor 21, the turbine casing 22, and a diffuser 4A.

The turbine rotor 21 extends along the axis Am. A plurality of turbine blade stages 23 arranged at intervals in the direction of the axis Am are provided on an outer circumferential surface of the turbine rotor 21. Each of the turbine blade stages 23 includes a plurality of turbine blades 24. The turbine blades 24 of each of the turbine blade stages 23 are arranged on the outer circumferential surface of the turbine rotor 21 at intervals in the circumferential direction of the axis Am.

In the turbine blades 24 constituting the final turbine blade stage 23 disposed furthest downstream among the plurality of turbine blade stages 23, portions thereof on the other side in the direction of the axis Am are curved from one side in the circumferential direction around the axis Am to the other side. In other words, the turbine blades 24 of the final turbine blade stage 23 are curved such that edge portions (trailing edges) thereof on the downstream side face a rear side in a rotation direction of the turbine rotor 21. It is only necessary for at least the turbine blades 24 of the last stage turbine blade stage 23 to be formed to be curved as described above, but the present invention is not limited to the above-described constitution. For example, the turbine blades 24 of the other turbine blade stages 23 may be curved like the turbine blades 24 of the final stage turbine blade stage 23.

The turbine casing 22 covers the turbine rotor 21 from the outer circumferential side. A plurality of turbine vane stages 25 arranged at intervals in the direction of the axis Am are provided on an inner circumferential surface of the turbine casing 22. The turbine vane stages 25 are disposed alternately with the turbine blade stages 23 in the direction of the axis Am. Each of the turbine vane stages 25 includes a plurality of turbine vanes 26. The turbine vanes 26 of each of the turbine vane stages 25 are arranged on the inner circumferential surface of the turbine casing 22 at intervals in the circumferential direction of the axis Am.

The compressor rotor 11 and the turbine rotor 21 are integrally connected in the direction of the axis Am. A gas turbine rotor 91 is constituted by the compressor rotor 11 and the turbine rotor 21. Similarly, the compressor casing 12 and the turbine casing 22 are integrally connected along the axis Am. A gas turbine casing 92 is constituted by the compressor casing 12 and the turbine casing 22.

The gas turbine rotor 91 is integrally rotatable around the axis Am within the gas turbine casing 92.

In operating the gas turbine 100A, first, the compressor rotor 11 (the gas turbine rotor 91) is driven to rotate using an external drive source. As the compressor rotor 11 rotates, external air is compressed sequentially, and high pressure air is generated. This high pressure air is supplied into the combustor 3 through the compressor casing 12. In the combustor 3, the fuel is mixed with the high pressure air and burnt to generate a high temperature and high pressure combustion gas. The combustion gas is supplied into the turbine 2 through the turbine casing 22. In the turbine 2, the combustion gas sequentially collides with the turbine blade stages 23 and the turbine vane stages 25, and thus a rotational driving force is applied to the turbine rotor 21 (the gas turbine rotor 91). This rotational energy is used for driving, for example, a generator G connected to a shaft end. The combustion gas which has driven the turbine 2 is exhausted to the outside as an exhaust gas after a pressure (static pressure) is increased when it passes through the diffuser 4A.

Figure 2:
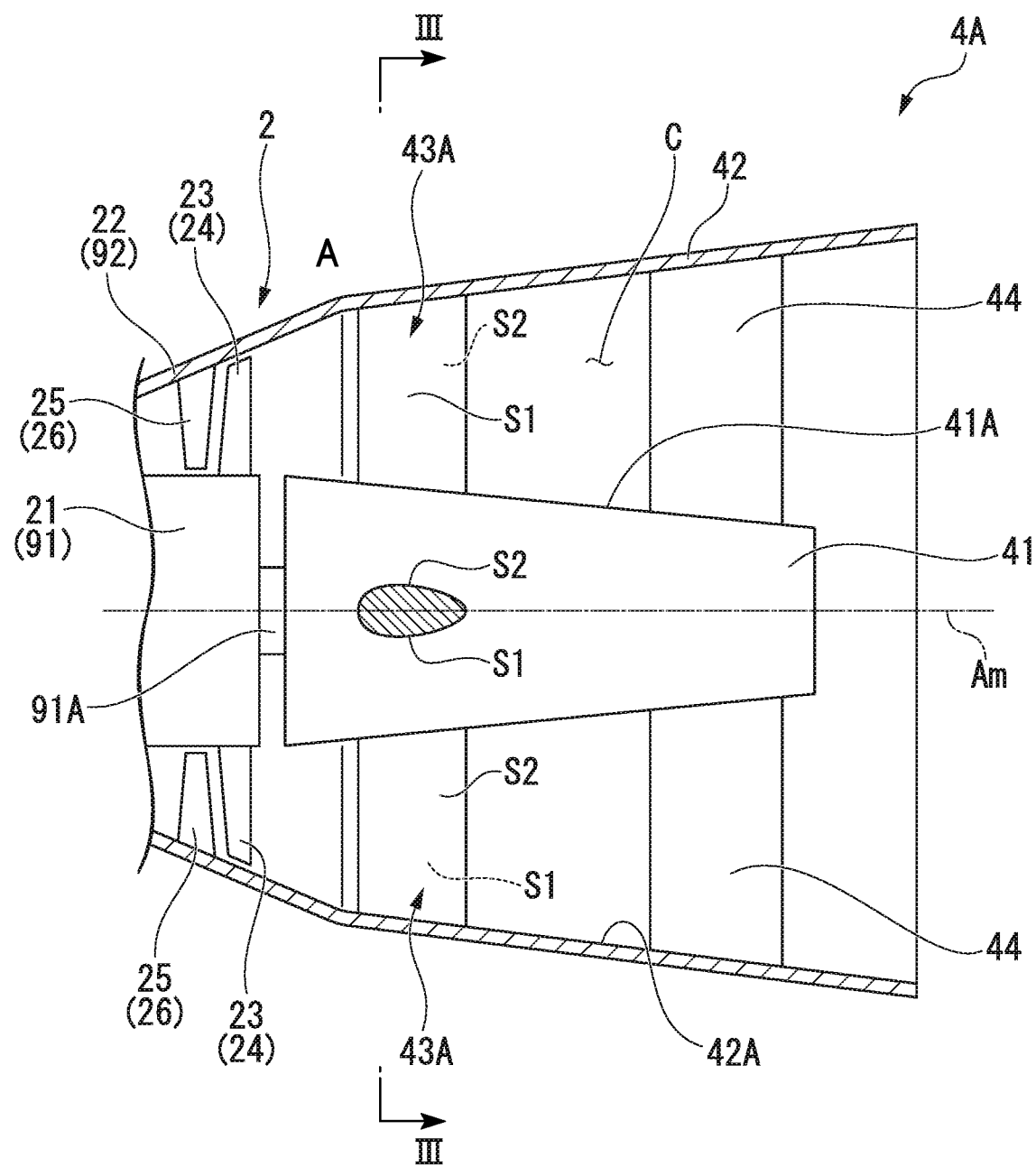
FIG. 2 is a cross-sectional view of a diffuser taken along an axis in the first embodiment of the present invention.

FIG. 2 is a cross-sectional view of the diffuser taken along the axis in the first embodiment of the present invention.

As shown in FIGS. 1 and 2, the diffuser 4A is provided integrally with the turbine casing 22 (the gas turbine casing 92). The diffuser 4A includes a combustor basket 41, an outer shell 42, a first strut 43A, and a second strut 44.

The combustor basket 41 is formed in a cylindrical shape which extends along the axis Am. The combustor basket 41 is formed so that a diameter of an outer circumferential surface 41A thereof gradually decreases from one side in the direction of the axis Am toward the other side. A bearing device (not shown) or the like which rotatably supports a shaft end 91A of the gas turbine rotor 91 is provided inside the combustor basket 41.

The outer shell 42 is formed in a cylindrical shape which covers the combustor basket 41 from the outer circumferential side. The outer shell 42 forms an exhaust flow path C through which the exhaust gas discharged from the turbine 2 flows between the outer shell 42 and the combustor basket 41. The outer shell 42 is formed so that a diameter of an inner circumferential surface 42A thereof gradually increases from one side in the direction of the axis Am toward the other side. That is, a diameter of a sectional area of the exhaust flow path C formed between the outer shell 42 and the combustor basket 41 (a sectional area orthogonal to the axis Am) gradually increases from one side in the direction of the axis Am toward the other side. As the sectional area of the exhaust flow path C gradually increases, kinetic energy of the exhaust gas flowing in the exhaust flow path C is gradually converted into pressure energy (pressure recovery).

The first strut 43A and the second strut 44 are disposed in the exhaust flow path C and connect the combustor basket 41 to the outer shell 42. The outer shell 42 is fixed to and supported by the combustor basket 41 by the first strut 43A and the second strut 44.

The first strut 43A is disposed to be adjacent to the final turbine blade stage 23 located furthest on the other side in the direction of the axis Am among the plurality of turbine blade stages 23 in the direction of the axis Am.

Figure 3:
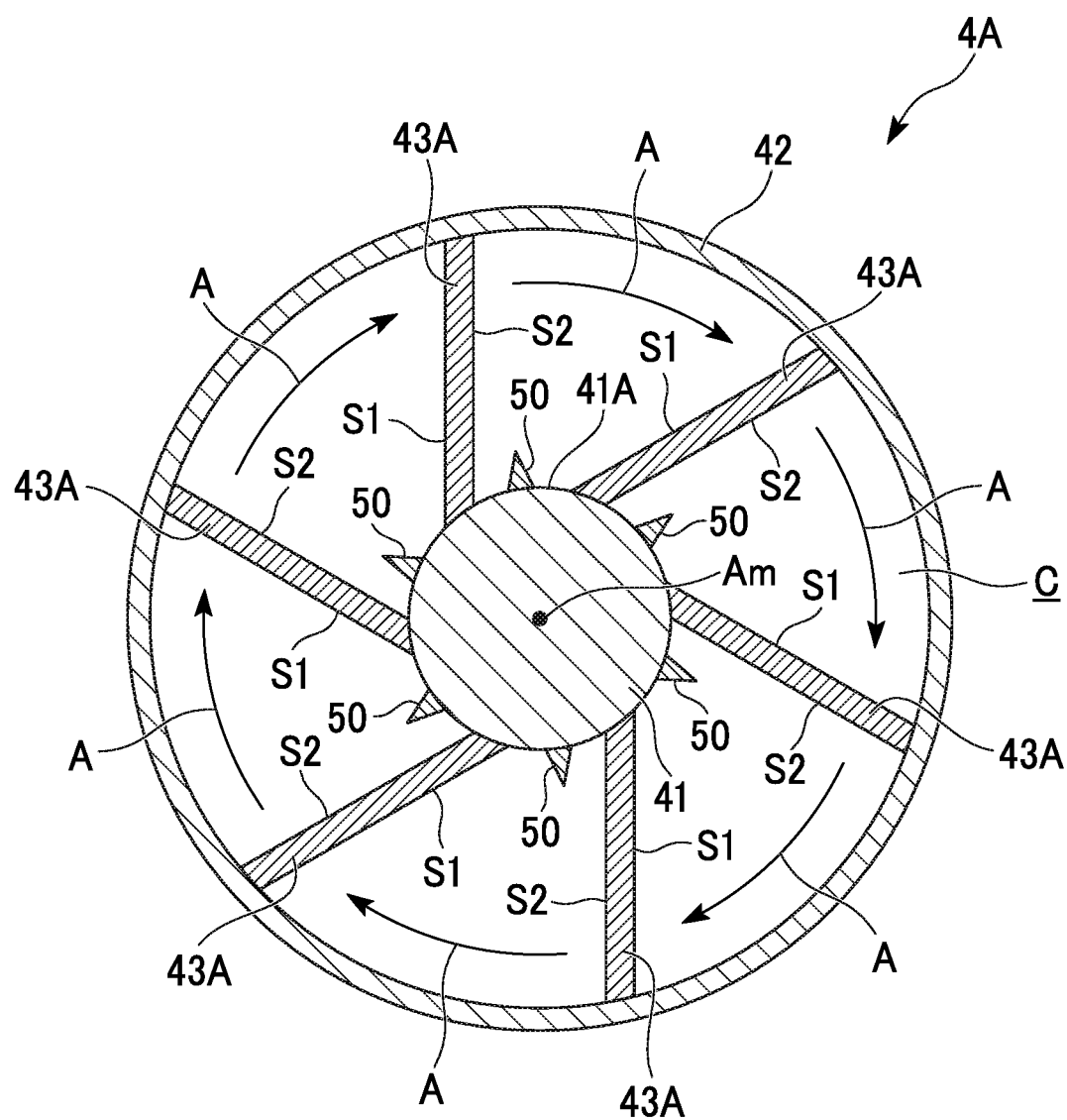
FIG. 3 is a cross-sectional view taken along line of FIG. 2.

FIG. 3 is a cross-sectional view taken along line III-III of FIG. 2.

As shown in FIG. 3, a plurality of first struts 43A are provided inside the exhaust flow path C at intervals in the circumferential direction around the axis Am. In the first embodiment, a case in which six first struts 43A radially extending toward the outer circumferential side are provided around the combustor basket 41 is exemplified. The first struts 43A are disposed at regular intervals in the circumferential direction around the axis Am.

These first struts 43A are so-called tangential struts inclined with respect to a normal line of the outer circumferential surface 41A of the combustor basket 41. More specifically, the first struts 43A are inclined to be disposed on a front side of the turbine rotor 21 in the rotation direction (indicated by an arrow A in FIG. 3) from an inner side in the radial direction of the axis Am toward an outer side. It is possible to reduce deviation of an axial center due to thermal elongation using such tangential struts.

In the rotation direction of the turbine rotor 21, a surface of the first strut 43A facing a rear side in the rotation direction is a pressure side S1, and a surface of the first strut 43A facing a front side in the rotation direction is a suction side S2. In the first embodiment, both the pressure side S1 and the suction side S2 are formed to extend in the same direction between the outer circumferential surface 41A of the combustor basket 41 and the inner circumferential surface 42A of the outer shell 42.

As shown in FIG. 2, the second strut 44 is provided for the main purpose of dispersing load burden of the first strut 43A. The second strut 44 is provided at a position spaced apart from the first strut 43A toward the other side in the direction of the axis Am. In the first embodiment, a case in which two second struts 44 are provided and extend in directions opposite to each other from the outer circumferential surface 41A of the combustor basket 41 is exemplified. The second struts 44 extend in the radial direction of the axis Am.

The first strut 43A and the second strut 44 in the first embodiment have a shape which can reduce the form resistance to the exhaust gas. For example, the shape capable of reducing the form resistance to the exhaust gas may include a shape having an elliptical cross section elongated in the flowing direction of the exhaust gas and a blade profile in which a chord extends in the flowing direction of the exhaust gas.

Figure 4:
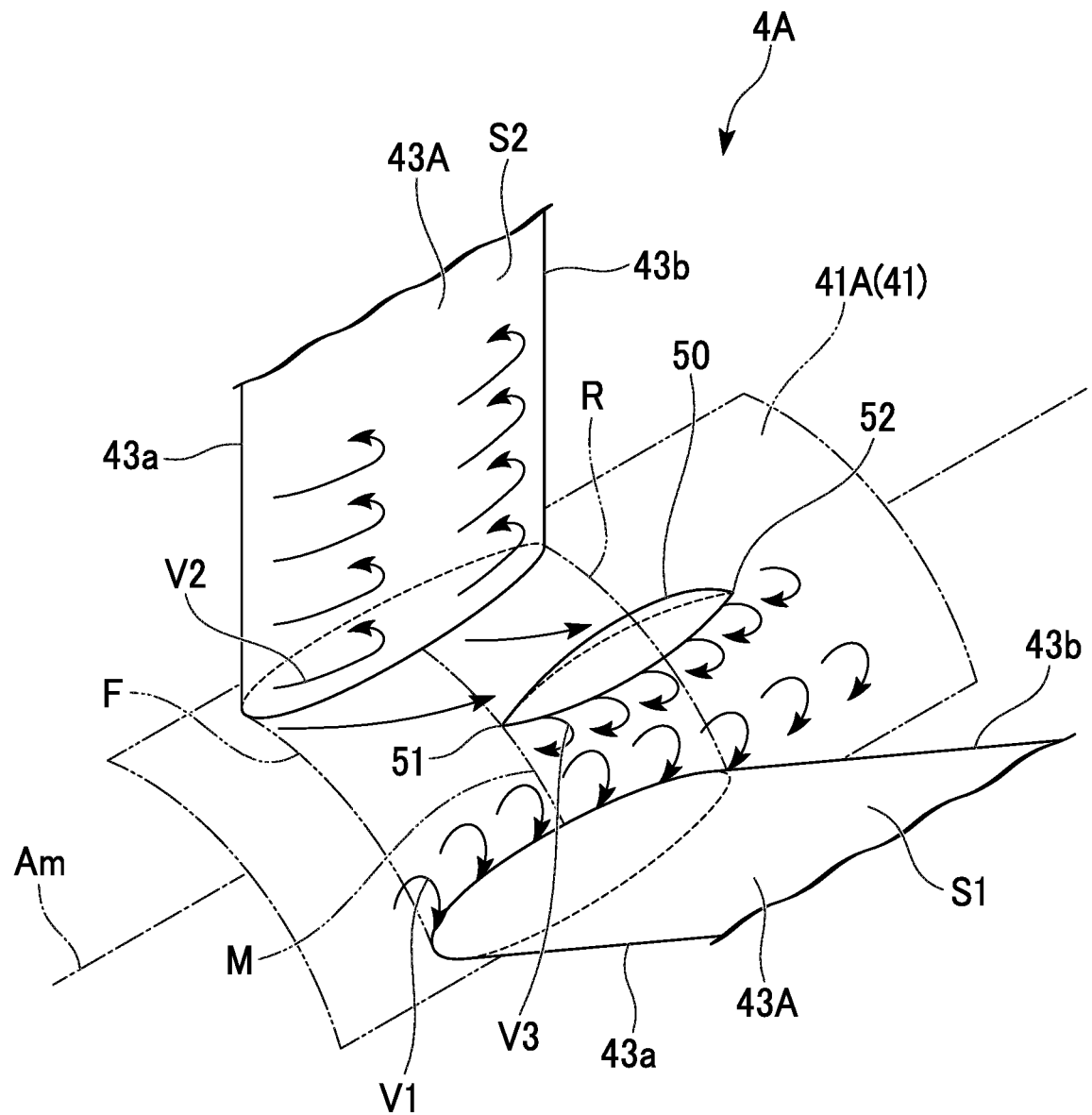
FIG. 4 is a perspective view of a combustor basket between first struts adjacent to each other in the first embodiment of the present invention.

FIG. 4 is a perspective view of the combustor basket between the first struts adjacent to each other in the first embodiment of the present invention.

As shown in FIG. 4, the diffuser 4A includes a protrusion 50 between the first struts 43A adjacent to each other in the circumferential direction around the axis Am. The protrusions 50 are provided one by one between the plurality of first struts 43A arranged and disposed in the circumferential direction. The protrusion 50 protrudes from the outer circumferential surface 41A of the combustor basket 41 and extends in the direction of the axis Am. The protrusion 50 in the first embodiment protrudes outward from the outer circumferential surface 41A in the radial direction of the axis Am.

Assuming that a distance between the adjacent first struts 43A in the circumferential direction around the axis Am is 100%, the protrusion 50 in the first embodiment can be formed in a range of ±30% from a position of a center (50%) of the adjacent first struts 43A. Further, the protrusion 50 may be disposed at a position of ±20% from the position of the above-mentioned center (50%) in the circumferential direction around the axis Am. Furthermore, the protrusion 50 may be disposed at a position of ±10% from the position of the center (50%) in the circumferential direction around the axis Am.

A front end (in other words, an end on one side in the direction of the axis Am) 51 of the protrusion 50 is disposed between a leading edge (in other words, an edge on one side in the direction of the axis Am) 43a of the first strut 43A and a trailing edge (in other words, an edge on the other side in the direction of the axis Am) 43b of the first strut 43A. For example, assuming that a chord length of the first strut 43A having a blade profile is 100%, a position of the front end 51 of the protrusion 50 can be disposed in a range of ±30% from a position of 50% of the chord length in a chord direction of the first strut 43A. Further, the position of the front end 51 of the protrusion 50 may be disposed in a range of ±20% from the position of 50% of the chord length in the chord direction of the first strut 43A, for example. Furthermore, the position of the front end 51 of the protrusion 50 may be disposed in a range of ±10% from the position of 50% of the chord length in the chord direction of the first strut 43A, for example.

A rear end (in other words, an end on the other side in the direction of the axis Am) 52 of the protrusion 50 is disposed farther along in the direction of the axis Am on the other side than the trailing edge 43b of the first strut 43A. The rear end 52 can be disposed as far as possible from the trailing edge 43b in a range on the other side from the trailing edge 43b in the direction of the axis Am. That is, the protrusion 50 may be formed as long as possible toward the other side in the direction of the axis Am. In this way, it is possible to alleviate a rapid increase in the flow path sectional area of the exhaust flow path C due to the absence of the first strut 43A on a downstream side from the trailing edge 43b of the first strut 43A. Thus, separation of a boundary layer can be minimized downstream from the trailing edge 43b. In FIG. 4, the position of the leading edge 43a in the direction of the axis Am is indicated by a symbol "F," the position of the center is indicated by a symbol "M," and the position of the trailing edge 43b is indicated by a symbol "R."

A height of the protrusion 50 protruding from the outer circumferential surface 41A of the combustor basket 41 may be set so that the pressure loss due to the form resistance of the protrusion 50 becomes smaller than the pressure loss due to the separation of the exhaust gas occurring on the outer circumferential surface 41A of the combustor basket 41. Further, the height of the protrusion 50 may be set to a height corresponding to a thickness of the boundary layer formed on the outer circumferential surface 41A and may be set to a height which is, for example, about 3% to 1% of a profile height of the first strut 43A. Since the thickness of the boundary layer formed on the outer circumferential surface 41A changes according to specifications of the diffuser 4A, the height of the protrusion 50 may be appropriately adjusted according to the thickness of the boundary layer. Further, the protrusion 50 may be formed to be higher than the thickness of the boundary layer. It is possible to involve a main flow of the exhaust gas and to further minimize development of the boundary layer by forming the protrusion 50 higher than the thickness of the boundary layer as described above.

The protrusion 50 has a blade profile. More specifically, the protrusion 50 is formed to be tapered toward one side in the direction of the axis Am and formed to be tapered toward the other side in the direction of the axis Am when seen from an outer side in the radial direction of the axis Am. In other words, a width dimension of the protrusion 50 gradually decreases toward both sides in the direction of the axis Am. In the first embodiment, the case in which the protrusion 50 has a width dimension which gradually decreases toward the outer side in the radial direction and a ridge line extending in the direction of the axis Am is formed is exemplified, but the protrusion 50 is not limited to such a shape.

Figure 5:
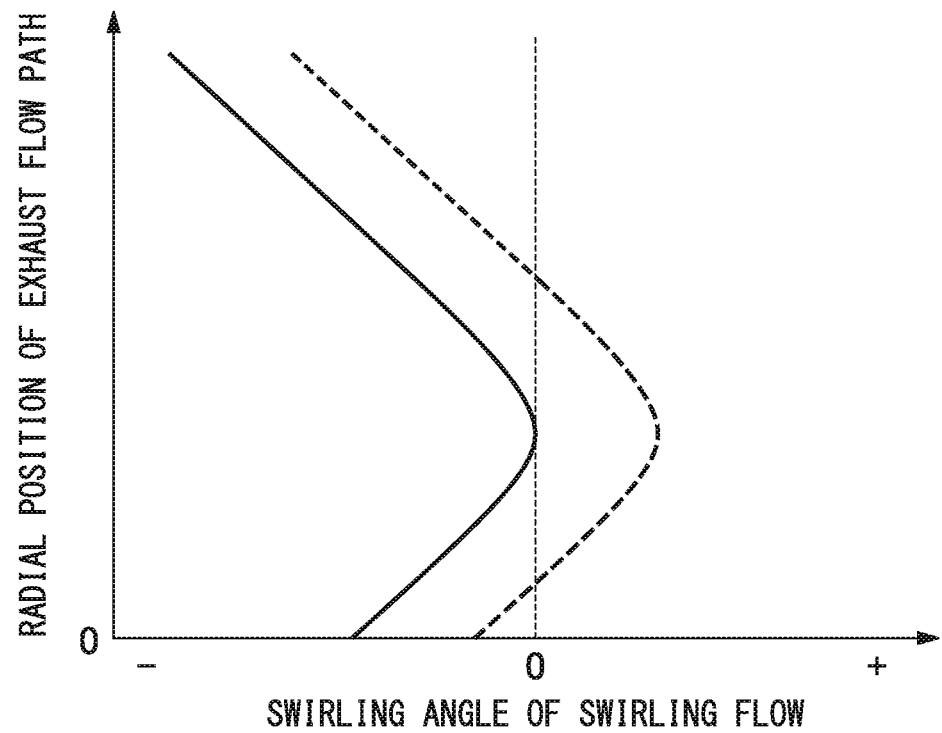
FIG. 5 is a graph showing a swirling angle of an exhaust gas with respect to a radial position of an inlet of an exhaust flow path in the first embodiment of the present invention.
Figure 6:
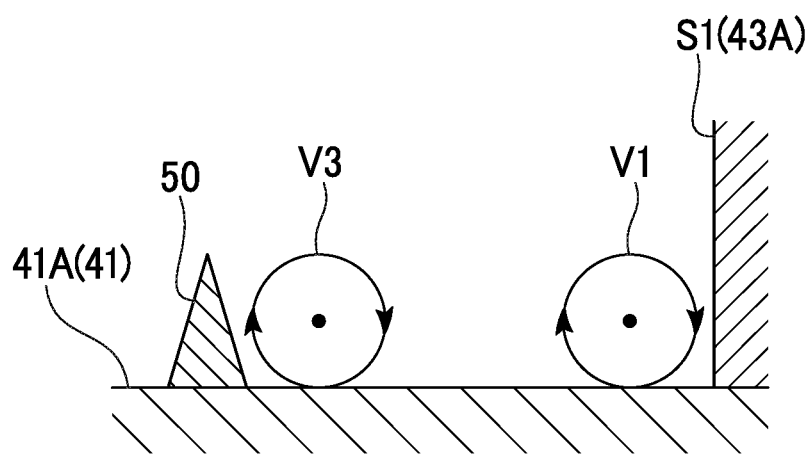
FIG. 6 is a view showing a rotation direction of a longitudinal vortex and a horseshoe vortex in the first embodiment of the present invention when seen from one side in an axial direction.

FIG. 5 is a graph showing a swirling angle of the exhaust gas with respect to a radial position of an inlet of the exhaust flow path in the first embodiment of the present invention. FIG. 6 is a view showing a rotation direction of a longitudinal vortex and a horseshoe vortex in the first embodiment of the present invention when seen from one side in an axial direction.

In FIG. 5, a horizontal axis shows a swirling angle of a swirling flow, and a vertical axis shows the radial position of the inlet of the exhaust flow path C. A plus (+) side of the horizontal axis indicates a state in which the swirling flow flows from the other side toward one side in the circumferential direction, and a minus (−) side of the horizontal axis shows a state in which the swirling flow flows from the one side to the other side in the circumferential direction. Further, the vertical axis indicates a position in the exhaust flow path C on an outer side in the radial direction of the axis Am with a position of the outer circumferential surface 41A of the combustor basket 41 as an origin point. In the case in which the turbine blade 24 is curved as described above, the exhaust gas discharged from the turbine 2 includes a swirling flow component which swirls in the circumferential direction of the axis Am.

When the gas turbine 100A having the above-described constitution is in a rated operation, the swirling angle of the swirling flow around the first strut 43A, that is, at the inlet of the exhaust flow path C is distributed as indicated by a broken line in the graph of FIG. 5. Specifically, a direction of the swirling angle of the swirling flow becomes negative in the vicinity of the outer circumferential surface 41A of the combustor basket 41 and the vicinity of the inner circumferential surface 42A of the outer shell 42, and the direction of the swirling angle of the swirling flow becomes positive in the vicinity of a center in the radial direction between the outer circumferential surface 41A and the inner circumferential surface 42A. This is because the pressure loss due to interference between a flow of a fluid and a structure inside the flow path is designed to be the smallest at the time of the rated operation. An absolute value of the swirling angle of the swirling flow in the rated operation can be made small by distributing the swirl angle of the swirling flow as shown by the broken line in FIG. 5.

On the other hand, in a state in which the gas turbine 100A is operated with a partial load instead of the rated operation, the swirling angle of the swirling flow increases to the minus side at the entire inlet of the exhaust flow path C in the radial direction. This is because the distribution of the swirling angle when the gas turbine 100A is operated with the partial load has such a distribution that the distribution (indicated by a broken line in FIG. 5) of the swirling angle during the rated operation is shifted to the minus side, as indicated by a solid line in the graph of FIG. 5. As the swirling angle increases to the minus side as described above, the separation of the flow by the structure in the exhaust flow path C tends to be large, and thus the pressure loss generated in the diffuser 4A may increase.

However, as shown in FIG. 4, in the diffuser 4A according to the above-described first embodiment, the protrusion 50 is disposed between the first struts 43A adjacent to each other in the circumferential direction around the axis Am. Additionally, these protrusions 50 protrude from the outer circumferential surface 41A of the combustor basket 41 and extend in the direction of the axis Am. Therefore, the protrusions 50 serve as a boundary, and thus a separation vortex V2 generated on the side of the suction side S2 of the first strut 43A disposed on the rear side in the rotation direction of the turbine rotor 21 among the first struts 43A adjacent to each other in the circumferential direction around the axis Am can be suppressed from affecting such as winding up the horseshoe vortex V1 generated on the side of the pressure side S1 of the first strut 43A disposed on the front side in the rotation direction.

Accordingly, it is possible to minimize instability of the boundary layer formed on the outer circumferential surface 41A of the combustor basket 41 from the center of the first strut 43A to the trailing edge 43b of the first strut 43A in the direction of the axis Am due to the horseshoe vortex V1 formed on the side of the pressure side S1 (the rear side in the rotation direction) of the first strut 43A located on the front side in the rotation direction.

Further, when the separation vortex V2 formed at the first strut 43A on the rear side in the rotation direction is directed to the first strut 43A on the front side in the rotation direction between the first struts 43A adjacent to each other in the circumferential direction around the axis Am, some of the separation vortex V2 crosses the protrusion 50. Therefore, a longitudinal vortex V3 having a vortex axis along the protrusion 50 extending in the direction of the axis Am is generated. As shown in FIG. 6, the longitudinal vortex V3 is a vortex tube which rotates in the same direction as the rotation direction of the horseshoe vortex V1 which is formed on the front side in the rotation direction of the first strut 43A and extends to the downstream side of the first strut 43A.

In this way, since the rotation directions of the longitudinal vortex V3 and the horseshoe vortex V1 are the same, a force is applied to the longitudinal vortex V3 and the horseshoe vortex V1 in a direction away from each other in the circumferential direction. That is, the arrangement of the longitudinal vortex V3 and the horseshoe vortex V1 is easily maintained. Therefore, even on the downstream side of the first strut 43A, the longitudinal vortex V3 and the horseshoe vortex V1 are easily maintained, and the development of the boundary layer can be minimized.

Accordingly, the separation of the flow of the exhaust gas from the outer circumferential surface 41A of the combustor basket 41 can be minimized even when the swirling angle of the exhaust gas is large as in the case of the above-described partial load. Therefore, the pressure loss in the exhaust flow path C can be minimized, and the pressure recovery due to the diffuser 4A can be efficiently performed.

As a result, it is possible to improve the performance of the turbine 2 and the gas turbine 100A.

Furthermore, when seen from the outer side in the radial direction of the axis Am, the protrusion 50 is formed to be tapered toward one side in the direction of the axis Am and is formed to be tapered toward the other side in the direction of the axis Am. It is possible to reduce the form resistance of the protrusion 50 with respect to the main flow of the exhaust gas flowing in the direction of the axis Am by forming the protrusion 50 in this way.

Second Embodiment

Next, a second embodiment of the present invention will be described with reference to the drawings. A gas turbine of the second embodiment is different from the gas turbine of the above-described first embodiment only in the constitution of the diffuser. Therefore, the same parts as those of the above-described first embodiment are designated by the same reference numerals, and redundant explanations will be omitted.

Figure 7:
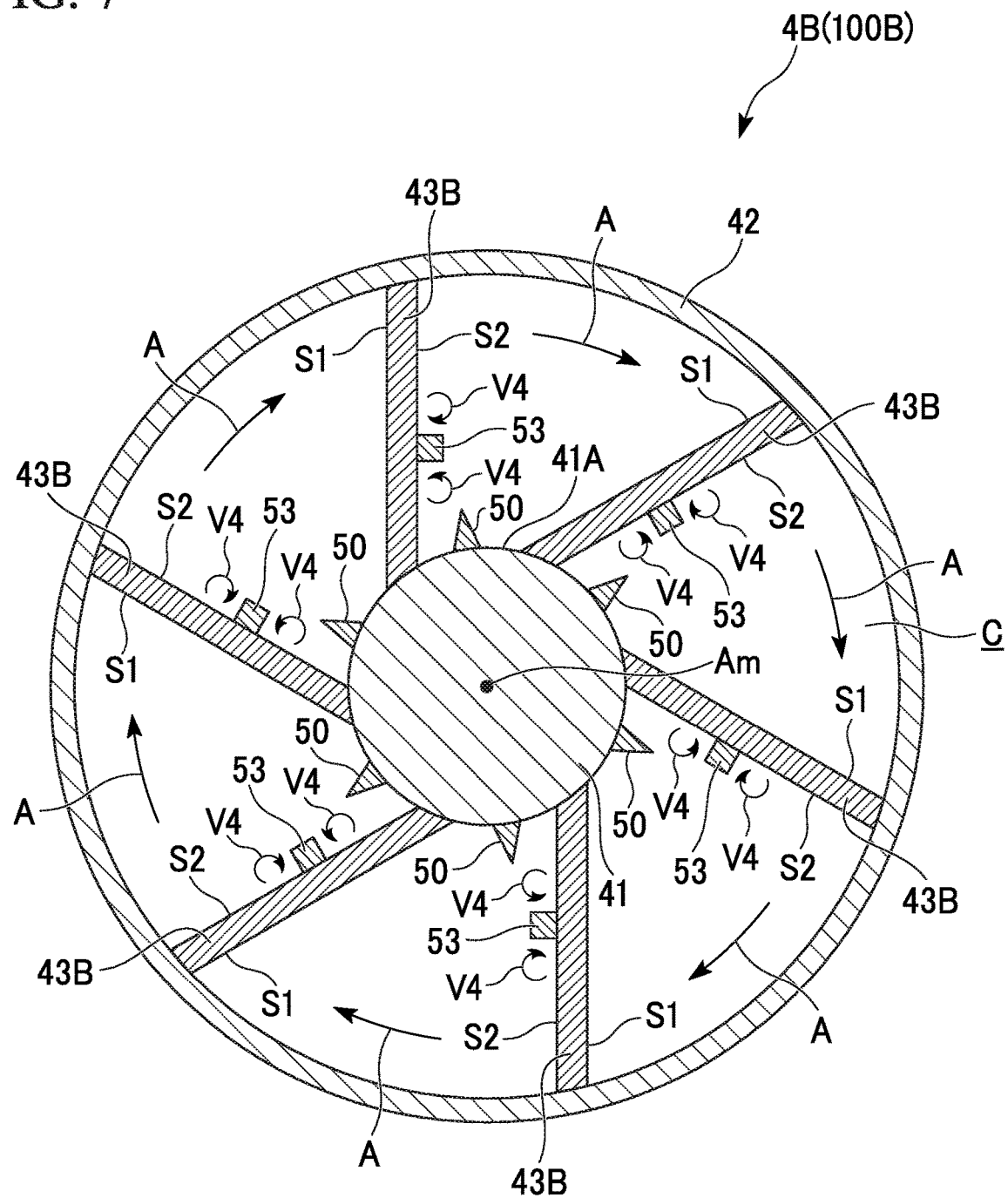
FIG. 7 is a cross-sectional view corresponding to FIG. 3 in a second embodiment of the present invention.
Figure 8:
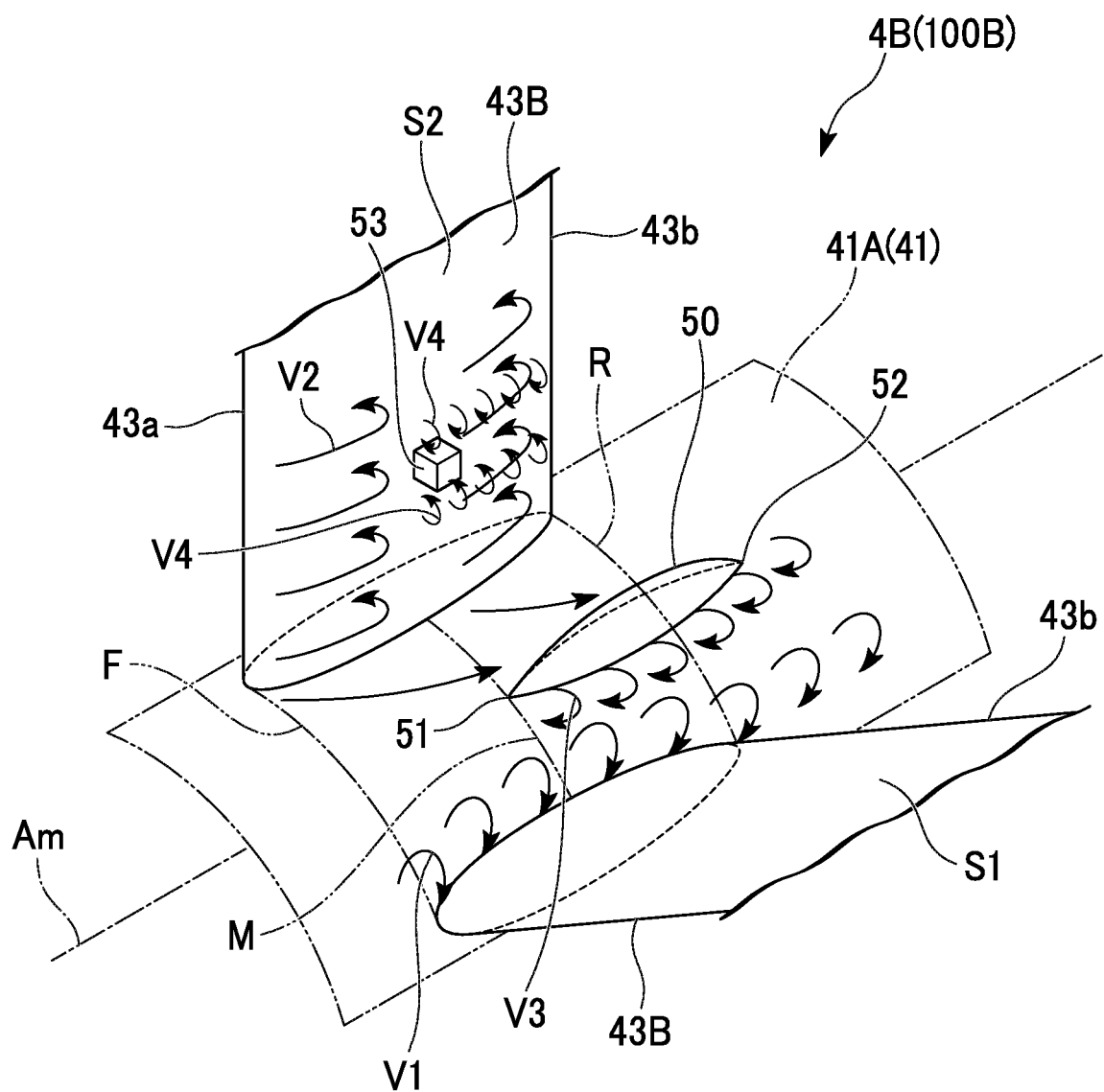
FIG. 8 is a perspective view corresponding to FIG. 4 in the second embodiment of the present invention.

FIG. 7 is a cross-sectional view corresponding to FIG. 3 in a second embodiment of the present invention. FIG. 8 is a perspective view corresponding to FIG. 4 in the second embodiment of the present invention.

As shown in FIGS. 7 and 8, a diffuser 4B of a gas turbine 100B according to the second embodiment is integrally provided with the turbine casing 22 (the gas turbine casing 92), like the diffuser 4A of the above-described first embodiment.

The gas turbine 100B of the second embodiment includes a compressor 1, a combustor 3, and a turbine 2, respectively, like the gas turbine 100A of the first embodiment.

The diffuser 4B includes a combustor basket 41, an outer shell 42, a first strut 43B, and a second strut 44.

Like the above-described first strut 43A, the first strut 43B is disposed inside the exhaust flow path C and connects the combustor basket 41 to the outer shell 42. The outer shell 42 is fixed to and supported by the combustor basket 41 by the first strut 43B and the second strut 44. The first struts 43B are disposed to be adjacent to the final turbine blade stage 23 located furthest on the other side in the direction of the axis Am among the plurality of turbine blade stages 23 in the direction of the axis Am.

A plurality of first struts 43B are provided inside the exhaust flow path C at intervals in the circumferential direction around the axis Am. In the second embodiment, like the first embodiment, a case in which six first struts 43B extend radially toward the outer circumferential side centering on the combustor basket 41 is exemplified. The first struts 43B are disposed at regular intervals in the circumferential direction around the axis Am.

Like the above-described first struts 43A, these first struts 43B are so-called tangential struts inclined with respect to a normal line of the outer circumferential surface 41A of the combustor basket 41. More specifically, the first struts 43B are inclined to be disposed on a front side of the turbine rotor 21 in the rotation direction (indicated by an arrow A in FIG. 7) from an inner side in the radial direction of the axis Am toward an outer side.

In the rotation direction of the turbine rotor 21, a surface of the first strut 43B facing a rear side in the rotation direction is a pressure side S1, and a surface of the first strut 43B facing a front side in the rotation direction is a suction side S2. In the first embodiment, both the pressure side S1 and the suction side S2 are formed to extend in the same direction between the outer circumferential surface 41A of the combustor basket 41 and the inner circumferential surface 42A of the outer shell 42.

The diffuser 4B has a convex portion 53. The convex portion 53 protrudes from the suction side S2 of each of the plurality of first struts 43B. The convex portion 53 generates a longitudinal vortex V4 on the suction side S2 of the first strut 43B. This longitudinal vortex V4 is generated on both sides of the convex portion 53 in the radial direction of the axis Am. The longitudinal vortex V4 is a vortex tube which extends to the downstream side (the other side in the direction of the axis Am) of the exhaust gas to wind around the convex portion 53. The longitudinal vortex V4 generated due to the convex portion 53 interferes with the separation vortex V2 generated in a region in the vicinity of a leading edge 43a of the first strut 43B. Due to this interference, the development of the separation vortex V2 is hindered.

In the above description, the case in which only one convex portion 53 is provided for one first strut 43B has been described. However, a plurality of protrusions 53 may be provided for one first strut 43B.

For example, the convex portion 53 may be provided on an upstream side of the portion at which the separation vortex V2 is generated. In this way, it is possible to minimize the generation of the separation vortex V2 due to the longitudinal vortex V4 formed by the projection 53.

Further, assuming that a distance from the outer circumferential surface 41A of the combustor basket 41 to the inner circumferential surface 42A of the outer shell 42 is 100%, the convex portion 53 may be disposed on the side closer to the outer circumferential surface 41A of the combustor basket 41 than a position of 50% in the radial direction of the axis Am. Furthermore, the convex portion 53 may be disposed on the side closer to the outer circumferential surface 41A of the combustor basket 41 than a position of 30% in the radial direction of the axis Am. In this way, since it can be disposed particularly at such a position that the negative swirling angle of the exhaust gas becomes large, the development of the separation vortex V2 can be inhibited efficiently.

Further, a dimension of the convex portion 53 which protrudes from the suction side S2 may be a dimension such that the pressure loss due to the form resistance of the convex portion 53 does not become larger than the pressure loss caused by the separation vortex V2. The pressure loss can be efficiently reduced by setting the protruding dimension of the convex portion 53 in this manner.

A shape of the convex portion 53 is not limited to the shape shown in FIGS. 7 and 8 as far as it protrudes from the suction side S2.

Like the above-described diffuser 4A, the diffuser 4B includes a protrusion 50 between the first struts 43B adjacent to each other in the circumferential direction around the axis Am. Since this protrusion 50 has the same constitution as that of the first embodiment, a detailed description thereof will be omitted.

Therefore, according to the above-described second embodiment, in addition to the operation and effect of the first embodiment, the longitudinal vortex V4 which is the same as the above-described horseshoe vortex is formed on both sides of the convex portion 53 by providing the convex portion 53. The longitudinal vortex V4 formed by the convex portion 53 interferes with the separation vortex V2 formed on the suction side S2 of the first strut 43B due to the swirling flow of the exhaust gas. Therefore, the development of the separation vortex V2 is minimized. That is, the boundary layer formed on the outer circumferential surface 41A of the combustor basket 41 can be suppressed from being wound up outward in the radial direction by the separation vortex V2.

Further, the convex portion 53 is disposed at a position closer to the combustor basket 41 than a position of a center in the radial direction (the above-described position of 50%). Therefore, the longitudinal vortex V4 which interferes with the separation vortex V2 can be formed by the convex portion 53 particularly at a position at which the separation vortex V2 is easily formed by the swirling flow. As a result, the generation of the separation vortex V2 can be minimized efficiently.

The present invention is not limited to the constitutions of the above-described embodiments, and the design can be changed without departing from the gist thereof.

For example, in each of the above-described embodiments, the case in which the plurality of protrusions 50 provided in one diffuser 4A or one diffuser 4B all have the same constitution has been described. However, the plurality of protrusions 50 may have different constitutions (shapes, arrangements, and so on) from each other. For example, the positions, the heights, and the widths of the front end 51 and the rear end 52 of the protrusion 50 may be different from each other for each of the plurality of protrusions 50.

Further, in the above-described second embodiment, the case in which the convex portion 53 is disposed on the side closer to the combustor basket 41 than the center in the radial direction of the axis Am has been exemplified, but the convex portion 53 may be disposed on the side closer to the outer shell 42 than the center in the radial direction of the axis Am.

Further, in the second embodiment, the case in which the convex portion 53 is disposed on the side closer to the combustor basket than the position of 50% or the position of 30% in the radial direction of the axis Am has been described, but the range is not limited thereto. For example, the convex portion 53 may be disposed within a range of ±30% in the radial direction with reference to the position of 50%.

Further, in each of the embodiments, the case in which the first struts 43A and 43B and the second strut 44 are provided has been described, but only the first struts 43A and 43B may be provided.

Third Embodiment

Next, a turbine and a gas turbine according to a third embodiment of the present invention will be described with reference to the drawings.

Figure 9:
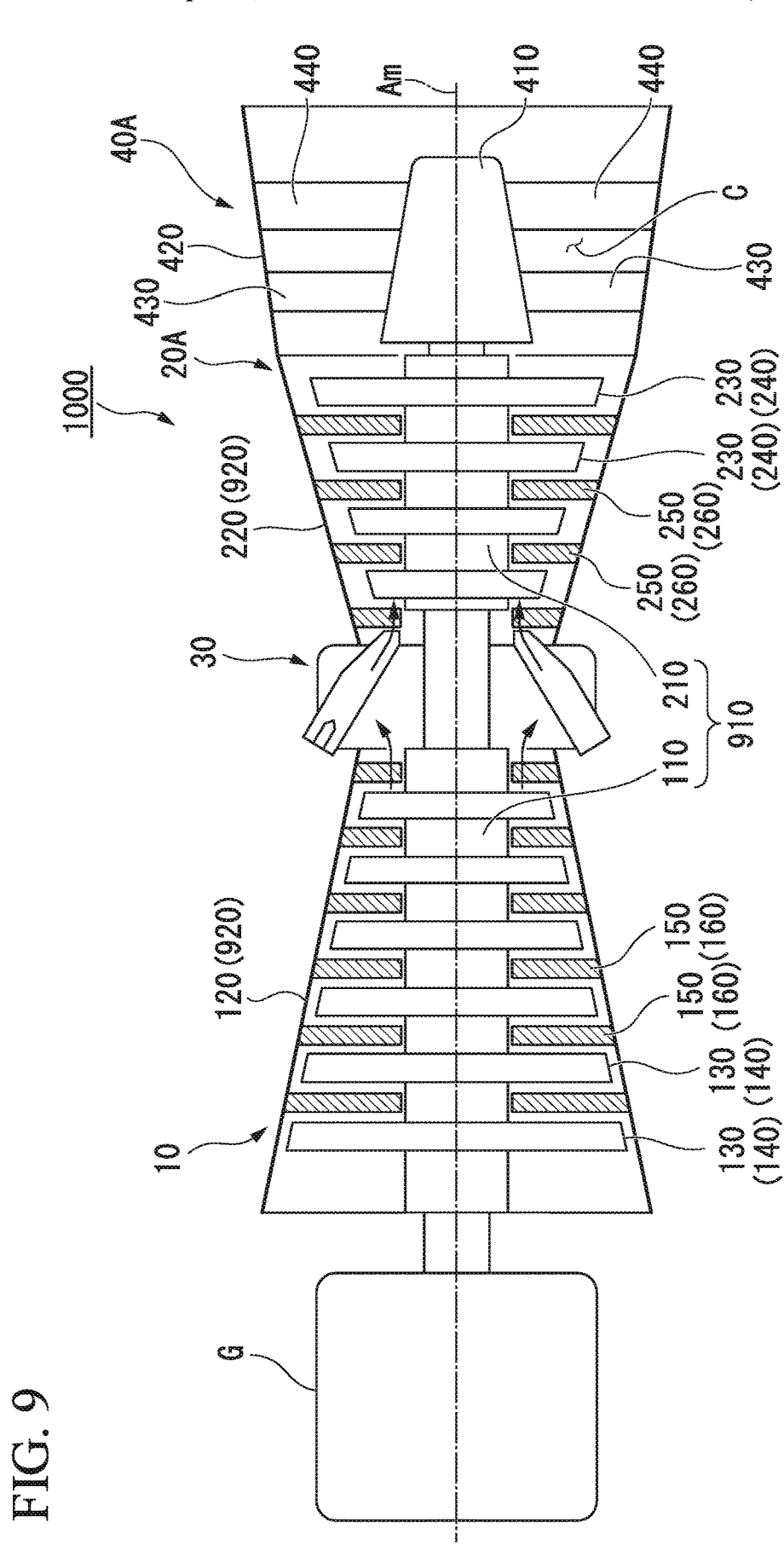
FIG. 9 is a constitution diagram showing a schematic constitution of a gas turbine according to a third embodiment of the present invention.

FIG. 9 is a constitution diagram showing a schematic constitution of a gas turbine according to a third embodiment of the present invention.

As shown in FIG. 9, a gas turbine 1000 according to the third embodiment includes a compressor 10, a combustor 30, and a turbine 20A.

The compressor 10 generates high pressure air. The compressor 10 includes a compressor rotor 110 and a compressor casing 120. The compressor casing 120 covers the compressor rotor 110 from an outer circumferential side and extends along the axis Am.

A plurality of compressor blade stages 130 arranged at intervals in the direction of the axis Am are provided on the outer circumferential surface of the compressor rotor 110. Each of the compressor blade stages 130 includes a plurality of compressor blades 140. The compressor blades 140 of each of the compressor blade stages 130 are arranged on the outer circumferential surface of the compressor rotor 110 at intervals in the circumferential direction of the axis Am.

A plurality of compressor vane stages 150 arranged at intervals in the direction of the axis Am are provided on the inner circumferential surface of the compressor casing 120. These compressor vane stages 150 are disposed alternately with the compressor blade stages 130 in the direction of the axis Am. Each of the compressor vane stages 150 includes a plurality of compressor vanes 160. The compressor vanes 160 of each of the compressor vane stages 150 are arranged on the inner circumferential surface of the compressor casing 120 at intervals in the circumferential direction of the axis Am.

The combustor 30 mixes the high pressure air generated by the compressor 10 with a fuel and burns it to generate a combustion gas. The combustor 30 is provided between the compressor casing 120 and the turbine casing 220 of the turbine 20A. The combustion gas generated by the combustor 30 is supplied to the turbine 20A.

The turbine 20A is driven by the combustion gas generated by the combustor 30. The turbine 20A includes a turbine rotor 210, a turbine casing 220, and a diffuser 40A.

The turbine rotor 210 extends along the axis Am. A plurality of turbine blade stages 230 arranged at intervals in the direction of the axis Am are provided on the outer circumferential surface of the turbine rotor 210. Each of the turbine blade stages 230 includes a plurality of turbine blades 240. The turbine blades 240 of each of the turbine blade stages 230 are arranged on the outer circumferential surface of the turbine rotor 210 at intervals in the circumferential direction of the axis Am.

In the turbine blades 240 constituting the final turbine blade stage 230 disposed furthest downstream among the plurality of turbine blade stages 230, portions thereof on the other side in the direction of the axis Am are curved from one side in the circumferential direction around the axis Am to the other side. In other words, the turbine blades 240 of the final turbine blade stage 230 are curved such that edge portions (trailing edges) thereof on the downstream side face a rear side in a rotation direction of the turbine rotor 210. It is only necessary for at least the turbine blades 240 of the last stage turbine blade stage 230 to be formed to be curved as described above, and the present invention is not limited to the above-described constitution. For example, the turbine blades 240 of the other turbine blade stages 230 may be curved like the turbine blades 240 of the final stage turbine blade stage 230.

The turbine casing 220 covers the turbine rotor 210 from the outer circumferential side. A plurality of turbine vane stages 250 arranged at intervals in the direction of the axis Am are provided on an inner circumferential surface of the turbine casing 220. The turbine vane stages 250 are disposed alternately with the turbine blade stages 230 in the direction of the axis Am. Each of the turbine vane stages 250 includes a plurality of turbine vanes 260. The turbine vanes 260 of each of the turbine vane stages 250 are arranged on the inner circumferential surface of the turbine casing 220 at intervals in the circumferential direction of the axis Am.

The compressor rotor 110 and the turbine rotor 210 are integrally connected in the direction of the axis Am. A gas turbine rotor 910 is constituted by the compressor rotor 110 and the turbine rotor 210. Similarly, the compressor casing 120 and the turbine casing 220 are integrally connected along the axis Am. A gas turbine casing 920 is constituted by the compressor casing 120 and the turbine casing 220.

The gas turbine rotor 910 is integrally rotatable around the axis Am within the gas turbine casing 920.

In operating the gas turbine 1000, first, the compressor rotor 110 (the gas turbine rotor 910) is driven to rotate by an external drive source. As the compressor rotor 110 rotates, external air is compressed sequentially, and high pressure air is generated. This high pressure air is supplied into the combustor 30 through the compressor casing 120. In the combustor 30, the fuel is mixed with the high pressure air and burnt to generate a high temperature and high pressure combustion gas. The combustion gas is supplied into the turbine 20A through the turbine casing 220. In the turbine 20A, the combustion gas sequentially collides with the turbine blade stages 230 and the turbine vane stages 250, and thus a rotational driving force is applied to the turbine rotor 210 (the gas turbine rotor 910). This rotational energy is used for driving, for example, a generator G or the like connected to a shaft end. The combustion gas which has driven the turbine 20A is exhausted to the outside as an exhaust gas after a pressure (static pressure) is increased when it passes through the diffuser 40A.

Figure 10:
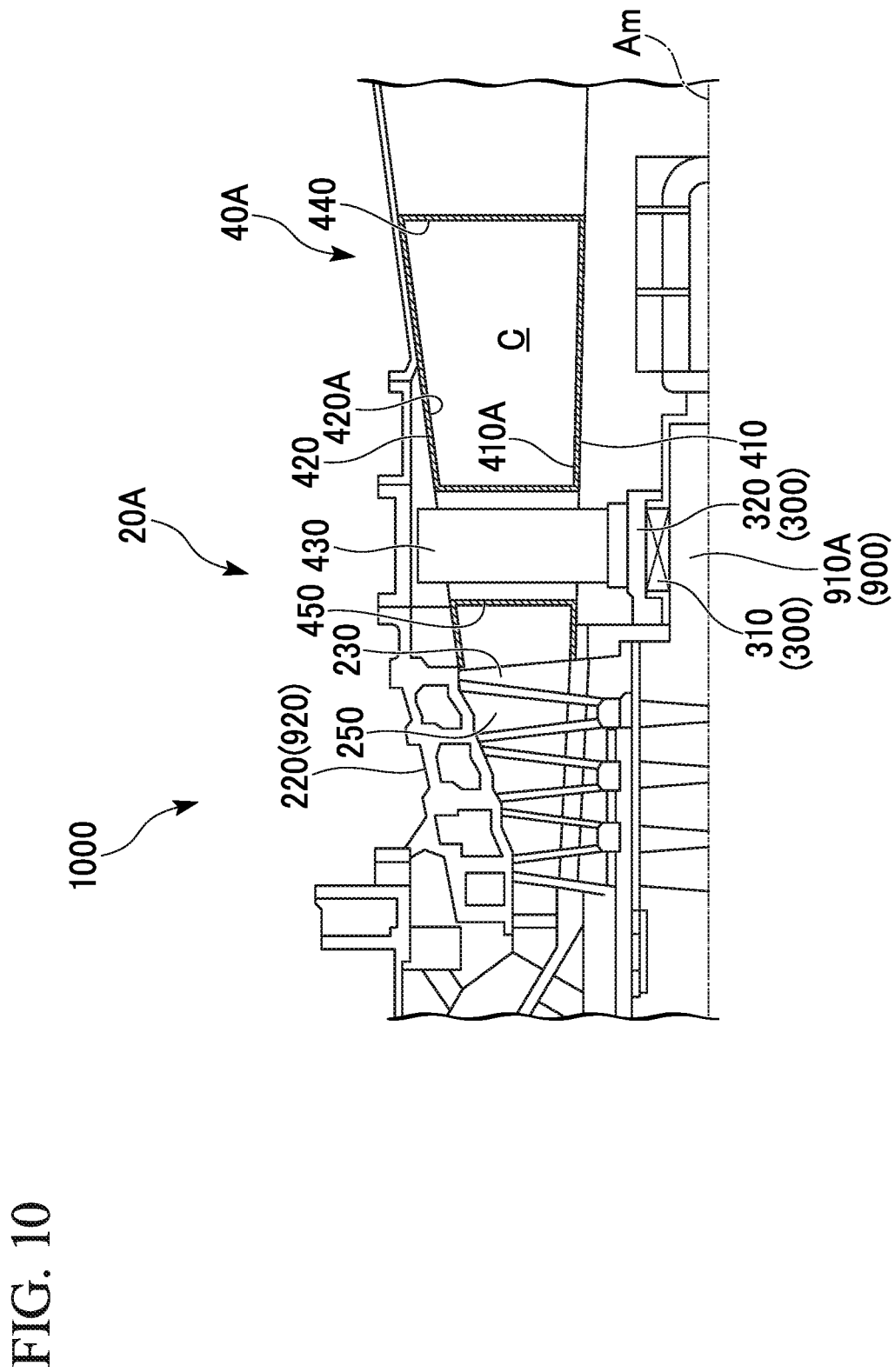
FIG. 10 is a cross-sectional view of a diffuser taken along the axis in the third embodiment of the present invention.

FIG. 10 is a cross-sectional view of the diffuser taken along the axis in the third embodiment of the present invention.

As shown in FIG. 10, the diffuser 40A is provided integrally with the turbine casing 220 (the gas turbine casing 920). The diffuser 40A includes a combustor basket 410, an outer shell 420, a first strut 430, a second strut 440, and a convex portion 500 (refer to FIG. 11).

The combustor basket 410 is formed in a cylindrical shape which extends along the axis Am. The combustor basket 410 is formed so that a diameter of an outer circumferential surface 410A thereof gradually decreases from one side in the direction of the axis Am toward the other side. A bearing device 300 which rotatably supports a shaft end 910A of the gas turbine rotor 910 is provided inside the combustor basket 410. The bearing device 300 includes a bearing 310 and a bearing housing 320. The bearing housing 320 is supported mainly by the outer shell 420 via the first strut 430.

The outer shell 420 is formed in a cylindrical shape which covers the combustor basket 410 from the outer circumferential side. The outer shell 420 forms an exhaust flow path C through which the exhaust gas discharged from the turbine 20A flows between the outer shell 420 and the combustor basket 410. The outer shell 420 is formed so that a diameter of an inner circumferential surface 420A thereof gradually increases from one side in the direction of the axis Am toward the other side. That is, a diameter of a sectional area of the exhaust flow path C formed between the outer shell 420 and the combustor basket 410 (a sectional area orthogonal to the axis Am) gradually increases from one side in the direction of the axis Am toward the other side. As the sectional area of the exhaust flow path C gradually increases in this way, kinetic energy of the exhaust gas flowing in the exhaust flow path C is gradually converted into pressure energy (pressure recovery).

The first struts 430 are covered by a strut cover 450 so as not to be exposed to the high temperature exhaust gas. These first struts 430 can use so-called tangential struts inclined with respect to a normal line of the outer circumferential surface 410A of the combustor basket 410. It is possible to reduce deviation of an axial center due to thermal elongation by adopting such tangential struts.

The second strut 440 is provided to disperse load burden of the first strut 430 and serves as, for example, a passage which enables entry of a person into the bearing 310 of the gas turbine 1000. The second strut 440 is formed in a cylindrical shape which extends in the radial direction of the axis Am. The second strut 440 is provided at a position spaced apart from the first strut 430 toward the other side in the direction of the axis Am.

The strut cover 450 and the second strut 440 in the third embodiment have a shape which can reduce the form resistance to the exhaust gas. For example, the shape capable of reducing the form resistance to the exhaust gas may include a shape having an elliptical cross section elongated in the flowing direction of the exhaust gas and a blade profile in which a chord extends in the flowing direction of the exhaust gas.

The gas turbine 1000 has a sealing mechanism (not shown). The sealing mechanism causes some of the compressed air generated by the compressor 10 to flow as a seal gas from a gap between the combustor basket 410 of the above-described diffuser 40A and the turbine rotor 210 toward the inside of the exhaust flow path C. With this sealing mechanism, the exhaust gas is prevented from flowing out of the gap.

Figure 11:
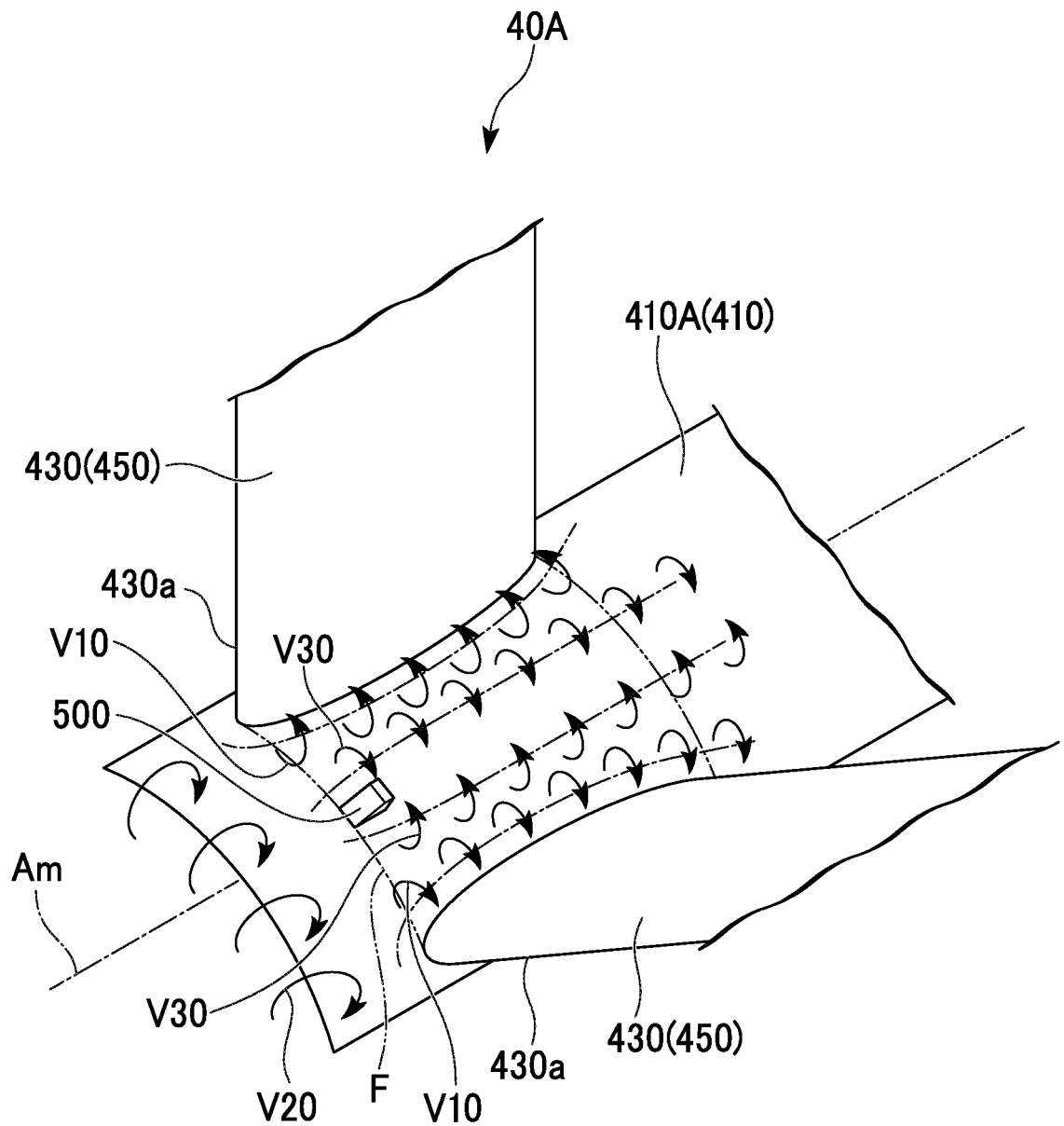
FIG. 11 is a perspective view of a combustor basket between first struts adjacent to each other in the third embodiment of the present invention.

FIG. 11 is a perspective view of a combustor basket between the first struts adjacent to each other in the third embodiment of the present invention.

As shown in FIG. 11, the diffuser 40A has the convex portion 500 between the first struts 430 (the strut cover 450) adjacent to each other in the circumferential direction around the axis Am. The convex portions 500 are provided one by one between the plurality of first struts 430 arranged and disposed in the circumferential direction. The convex portion 500 protrudes from the outer circumferential surface 410A of the combustor basket 410. The convex portion 500 in the third embodiment protrudes outward from the outer circumferential surface 410A in the radial direction of the axis Am.

Here, a protruding amount (in other words, a height in the radial direction) of the convex portion 500 can be formed to be slightly lower than a thickness of a boundary layer (not shown) formed by a flow of the exhaust gas on the outer circumferential surface 410A of the combustor basket 410. More specifically, the protruding amount of the convex portion 500 may be 5% of a height (profile height) of the first strut 430 in the radial direction of the axis Am. Further, the protruding amount of the convex portion 500 may be 3% of the height of the first strut 430. Furthermore, the protruding amount of the convex portion 500 may be 1% of the height of the first strut 430. Since the thickness of the boundary layer changes according to specifications of the diffuser 40A, the protruding amount of the convex portion 500 may be appropriately adjusted according to the thickness of the boundary layer.

Assuming that a distance between the adjacent first struts 430 in the circumferential direction around the axis Am is 100%, the convex portion 500 in the third embodiment can be formed in a range of ±30% from a position of a center (50%) of the adjacent first struts 430. Further, the convex portion 500 may be disposed at a position of ±20% from the position of the above-mentioned center (50%) in the circumferential direction around the axis Am. Furthermore, the convex portion 500 may be disposed at a position of ±10% from the position of the center (50%) in the circumferential direction around the axis Am.

Further, assuming that the entire length of the first strut 430 in the direction of the axis Am is 100%, the convex portion 500 can be located within a region of ±10% of the entire length of the first strut 430 with reference to a position (hereinafter, simply referred to as a "leading edge position," a position indicated by a two-dot chain line F in FIG. 11) of a leading edge (in other words, an edge on one side in the direction of the axis Am) 430a of the first strut 430 in the direction of the axis Am. Further, the convex portion 500 may be disposed within a region of ±5% with reference to the leading edge position in the direction of the axis Am. Furthermore, the convex portion 500 may be disposed within a region of ±3% with reference to the leading edge position in the direction of the axis Am. Also, the convex portion 500 may be disposed within a region of ±2% with reference to the leading edge position in the direction of the axis Am.

The length of the convex portion 500 in the direction of the axis Am may be any length as far as it is within the above range with reference to the position of the leading edge 430a. For example, it may be formed to have a length equal to a length of the above-described region in the direction of the axis Am.

The convex portion 500 may be formed to be tapered toward an outer side in the radial direction of the axis Am. In FIG. 11, the case in which the protruding amount of the convex portion 500 increases from one side (an upstream side) in the direction of the axis Am to the other side (a downstream side) has been described as an example of the tapered shape. However, as far as it is tapered, it is not limited to this shape.

However, during the operation of the gas turbine 1000, the seal gas may flow inward in the radial direction of the axis Am at an inlet of the diffuser 40A. This seal gas interferes with the flow in the unstable boundary layer formed on the outer circumferential surface 410A of the combustor basket 410. Here, the flow in the boundary layer becomes a secondary flow represented by a horseshoe vortex generated at a joining portion between the first strut 430 and the outer circumferential surface 410A of the combustor basket 410 or a three-dimensional flow caused by a pressure gradient due to a circumferential inclination of the first strut 430, and separation tends to occur when the disturbance expands. The flow in the boundary layer increases vorticity in the vertical direction due to the inflow of the seal gas. That is, the flow in the boundary layer includes a vortex V20 (refer to FIG. 11) having a vortex axis in the circumferential direction mainly around the axis Am. The boundary layer in which the vorticity in the vertical direction is increased develops significantly toward the downstream side as compared with a case in which the seal gas does not flow in. Particularly, since the sectional area of the flow path rapidly increases with a position of a trailing edge 430b of the first strut 430 as a boundary, a flow velocity may further decrease, and the separation of the boundary layer may occur.

As described above, in the diffuser 40A of the third embodiment, the convex portion 500 is disposed between the first struts 430 adjacent to each other in the circumferential direction around the axis Am. These convex portions 500 are disposed near the position of the leading edge 430a of the first strut 430 in the direction of the axis Am. The flow in the boundary layer having the vorticity in the vertical direction as a result of the above-described interference of the seal gas is wound around the convex portion 500 in the vicinity of the position of the leading edge 430a of the first strut 430.

Accordingly, a longitudinal vortex V30 having a vortex axis in the flowing direction of the exhaust gas is formed on both sides of the convex portion 500 in the circumferential direction. This longitudinal vortex V30 extends downstream from the convex portion 500 and forms a vortex tube. This longitudinal vortex V30 provides momentum to the exhaust gas in the boundary layer located downstream from the vicinity of the leading edge 430a of the first strut 430. Therefore, even when the seal gas flows in as described above, it is possible to minimize the occurrence of the so-called boundary layer separation due to the development of the boundary layer by providing the momentum to the flow in the boundary layer before the boundary layer develops. As a result, it is possible to improve the performance by minimizing the pressure loss of the diffuser 40A.

Figure 12:
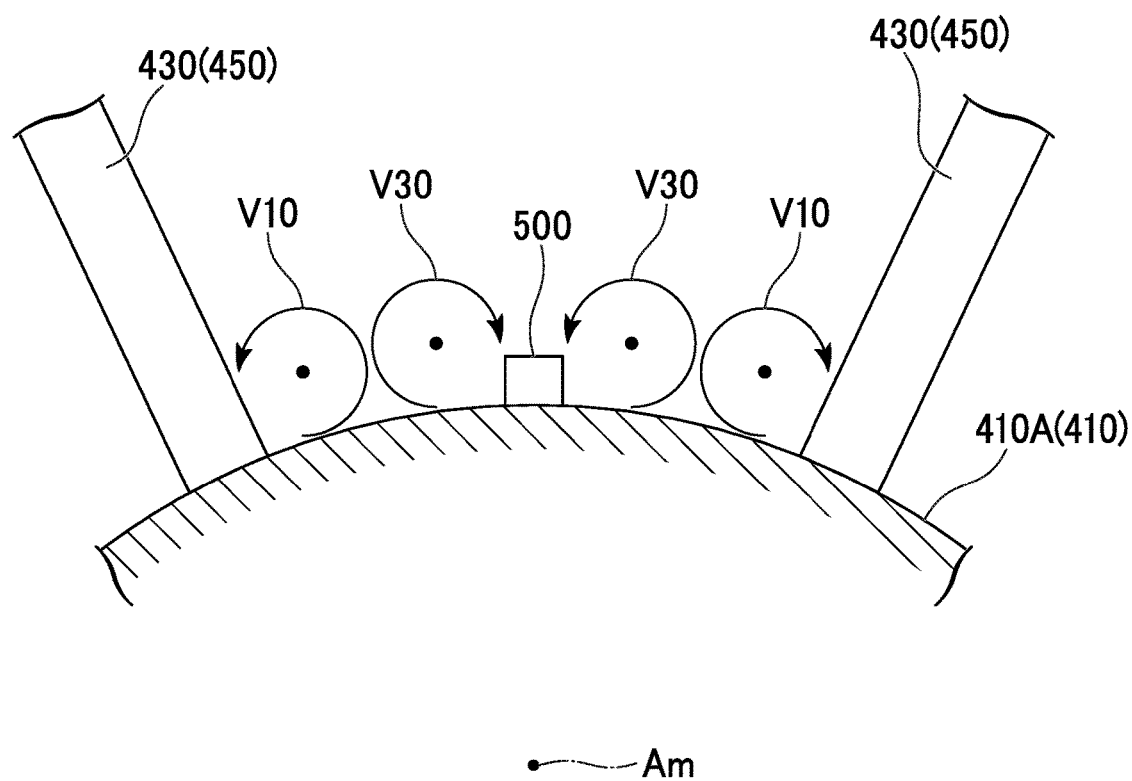
FIG. 12 is a view of a vortex around a convex portion in the third embodiment of the present invention when seen from one side in the axial direction.

FIG. 12 is a view of a vortex around the convex portion in the third embodiment of the present invention when seen from one side in the axial direction.

As shown in FIG. 12, the longitudinal vortex V30 rotates in a direction opposite to that of the adjacent horseshoe vortex V10. Since the rotation directions of the longitudinal vortex V30 and the horseshoe vortex V10 are opposite to each other as described above, the flow of the longitudinal vortex V30 and the flow of the horseshoe vortex V10 flow in the same direction at an adjacent place and act in a direction to promote rotation of each other without disturbing, and thus the longitudinal vortex V30 and the horseshoe vortex V10 are stabilized. Therefore, the longitudinal vortex V30 and the horseshoe vortex V10 are easily maintained even on the downstream side of the first strut 430, and the development of the boundary layer can be further minimized.

Fourth Embodiment

Next, a fourth embodiment of the present invention will be described with reference to the drawings. This fourth embodiment is different only in that a guide plate is provided in the above-described third embodiment. Therefore, the same parts as those of the above-described third embodiment are designated by the same reference numerals, and redundant explanations thereof will be omitted.

A gas turbine 1000 according to the fourth embodiment includes a compressor 10, a combustor 30, and a turbine 20B, like the above-described third embodiment. Further, the turbine 20B includes a turbine rotor 210, a turbine casing 220, and a diffuser 40B.

Figure 13:
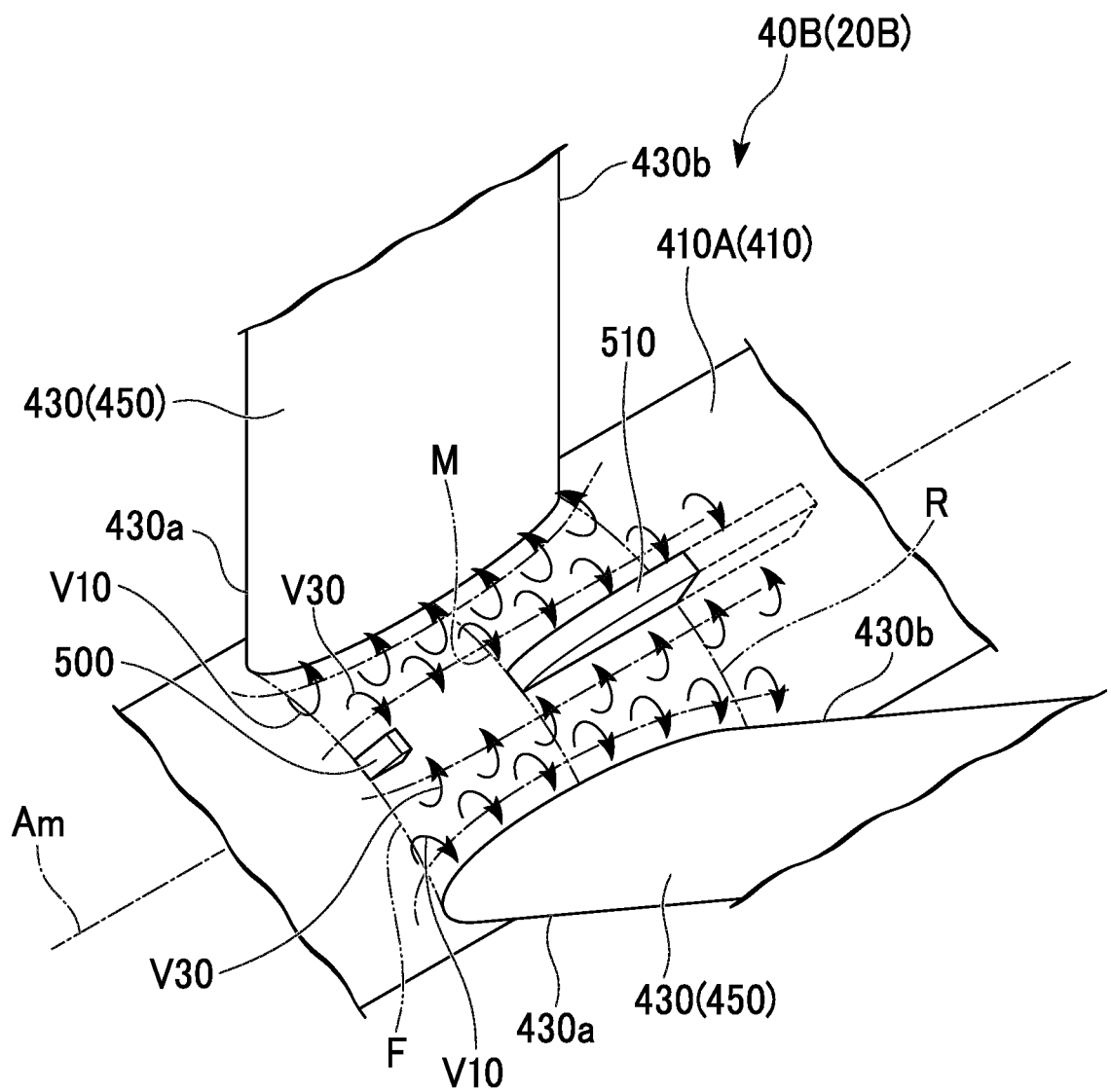
FIG. 13 is a view corresponding to FIG. 11 in a fourth embodiment of the present invention.

FIG. 13 is a view corresponding to FIG. 11 in a fourth embodiment of the present invention.

As shown in FIG. 13, the diffuser 40B according to the fourth embodiment includes a combustor basket 410, an outer shell 420 (not shown in FIG. 13), a first strut 430, a second strut 440, a convex portion 500, and a guide plate 510.

The convex portion 500 has the same constitution as that of the third embodiment and is provided one by one between a plurality of first struts 430 arranged and disposed in the circumferential direction around the axis Am. These convex portions 500 protrude from the outer circumferential surface 410A of the combustor basket 410.

The guide plate 510 guides a longitudinal vortex V30 generated at the convex portion 500 to the downstream side. The guide plate 510 is provided one by one between the plurality of first struts 430 arranged and disposed in the circumferential direction around the axis Am, like the convex portion 500. These guide plates 510 are formed to extend in the direction of the axis Am and are disposed at intervals on the downstream side of the convex portion 500 in the flowing direction of the exhaust gas.

Also, the guide plate 510 is formed to protrude from the outer circumferential surface 410A of the combustor basket 410 toward an outer side in the radial direction of the axis Am. The guide plate 510 exemplified in the fourth embodiment is formed in a flat plate shape which extends outward in the radial direction. Further, the guide plate 510 exemplified in the fourth embodiment is formed so that a protruding amount gradually increases from one side in the direction of the axis Am to the other side. The guide plate 510 may be set so that a maximum protruding amount thereof is equal to a protruding amount of the convex portion 500.

The guide plate 510 exemplified in the fourth embodiment extends from a position of 50% of the chord length of the first strut 430 relative to the leading edge 430a of the first strut 430 (in other words, an intermediate position between the leading edge 430a and the trailing edge 430b in the direction of the axis Am) to a position of the trailing edge 430b of the first strut 430. In FIG. 13, the position of the trailing edge 430b is indicated by a symbol "R," and the intermediate position between the leading edge 430a and the trailing edge 430b is indicated by a symbol "M".

A thickness (dimension) of the guide plate 510 in the circumferential direction around the axis Am is formed to be equal to a dimension of the convex portion 500 in the circumferential direction around the axis Am.

As indicated by a broken line in FIG. 13, the guide plate 510 may extend to the downstream side from the position of the trailing edge 430b. In this way, it is possible to minimize a rapid increase in a flow path sectional area of the exhaust gas on the downstream side from the position of the trailing edge 430b of the first strut 430. Further, each position of an upstream end and a downstream end of the guide plate 510 according to the fourth embodiment in the direction of the axis Am is one example and is not limited to the above position as far as it is a position capable of guiding the longitudinal vortex V30 formed by the convex portion 500.

According to the above-described fourth embodiment, like the third embodiment, the longitudinal vortex V30 can be formed by the convex portion 500. Also, as the guide plate 510 is provided, the longitudinal vortex V30 formed by the convex portion 500 is maintained on the further downstream side, and the disturbance of the longitudinal vortex V30 can be regulated (rectified).

Fifth Embodiment

Next, a fifth embodiment of the present invention will be described with reference to the drawings. This fifth embodiment is different only in that the convex portion and the guide plate of the fourth embodiment are integrally provided. Therefore, the same parts as those of the above-described fourth embodiment are designated by the same reference numerals, and redundant explanations thereof will be omitted.

A gas turbine 1000 according to the fifth embodiment includes a compressor 10, a combustor 30, and a turbine 20C, like the above-described third embodiment. Also, the turbine 20C has a turbine rotor 210, a turbine casing 220, and a diffuser 40C.

Figure 14:
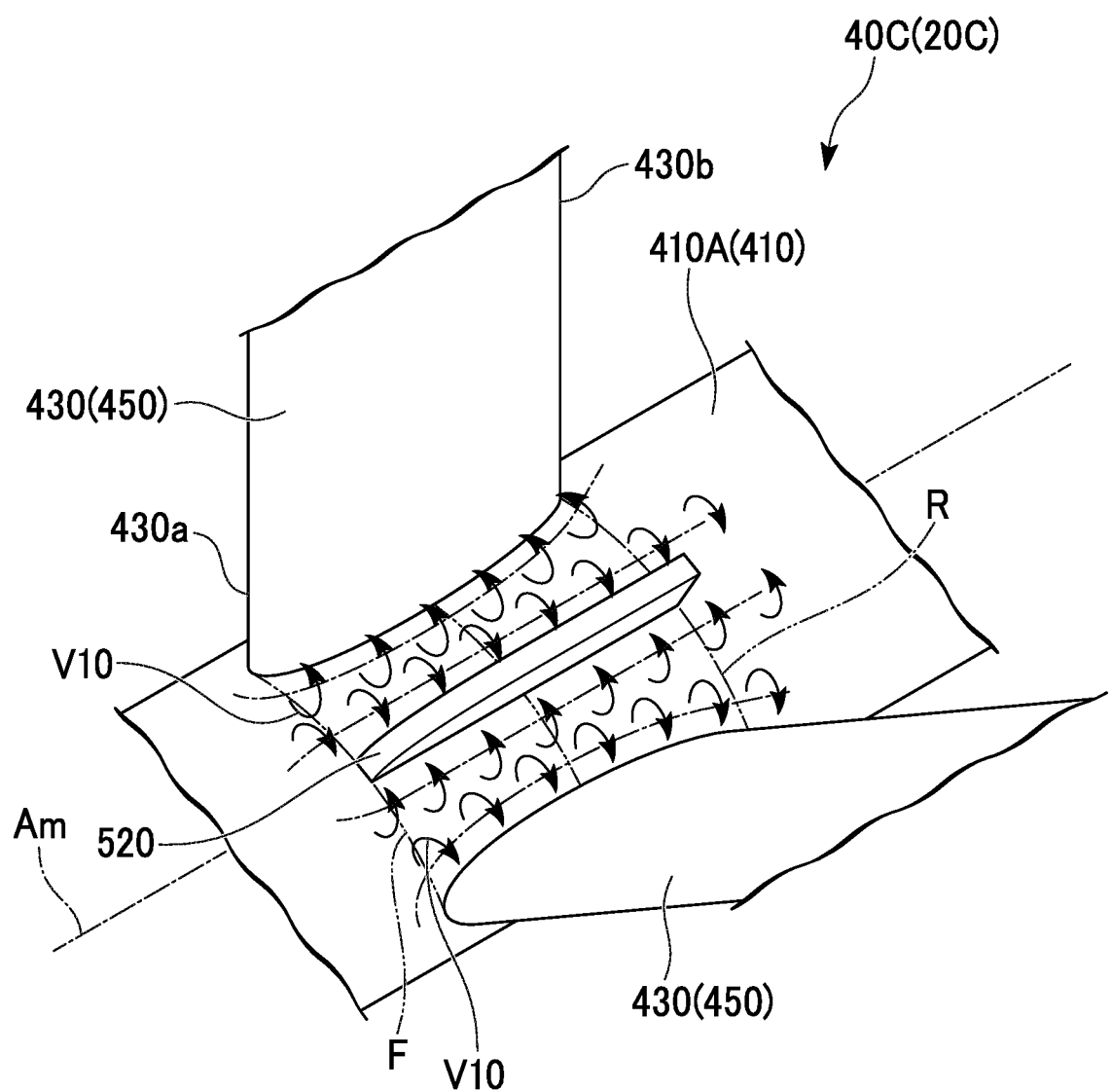
FIG. 14 is a view corresponding to FIG. 11 in a fifth embodiment of the present invention.

FIG. 14 is a view corresponding to FIG. 11 in a fifth embodiment of the present invention.

As shown in FIG. 14, the diffuser 40C according to the fifth embodiment includes a combustor basket 410, an outer shell 420 (not shown in FIG. 14), a first strut 430, a second strut 440, and a convex guide portion 520.

The convex guide portions 520 are provided one by one between the plurality of first struts 430 arranged and disposed in the circumferential direction around the axis Am.

Assuming that a distance between the adjacent first struts 430 in the circumferential direction around the axis Am is 100%, the convex guide portions 520 according to the fifth embodiment can be formed in a range of ±30% from a position of a center (50%) of the adjacent first struts 430. Further, the convex guide portions 520 may be disposed at a position of ±20% from the position of the center (50%) in the circumferential direction around the axis Am. Furthermore, the convex portion 500 may be disposed at a position of ±10% from the position of the center (50%) in the circumferential direction around the axis Am.

The convex guide portions 520 have a shape in which a length thereof in the direction of the axis Am is extended, such that the upstream end (the end in the direction of the axis Am) of the guide plate 510 of the above-described fourth embodiment is disposed in the vicinity of the leading edge 430a of the above-mentioned first strut 430 in the direction of the axis Am. That is, these convex guide portions 520 are formed to extend in the direction of the axis Am.

The convex guide portions 520 extend from an inner side of the region of ±10% of the entire length of the strut 430 in the direction of the axis Am with reference to the position of the leading edge 430a of the first strut 430 in the direction of the axis Am toward the position of the trailing edge 430b of the first strut 430. The convex guide portions 520 may extend from an inner side of the region of ±5% of the entire length of the first strut 430 in the direction of the axis Am with reference to the position of the leading edge 430a to the position of the trailing edge 430b of the first strut 430. Further, the convex guide portions 520 may extend from an inner side of the region of ±3% of the entire length of the first strut 430 in the direction of the axis Am with reference to the position of the leading edge 430a of the first strut 430 toward the position of the trailing edge 430b of the first strut 430.

The convex guide portions 520 are formed to further protrude outward from the outer circumferential surface 410A of the combustor basket 410 in the radial direction of the axis Am. The convex guide portion 520 exemplified in the fifth embodiment is formed in a flat plate shape which extends outward in the radial direction. Further, the convex guide portion 520 exemplified in the fifth embodiment is formed so that the protruding amount gradually increases from one side (the upstream side) in the direction of the axis Am toward the other side (the downstream side). The maximum protruding amount of the convex guide portion 520 can be formed to be the same as that of the convex portion 500 of the above-described third embodiment.

Therefore according to the fifth embodiment, the flow in the boundary layer having the vorticity in the vertical direction due to the interference of the seal gas is wound around the convex guide portion 520, and the longitudinal vortex V30 can be formed. Furthermore, since the convex guide portion 520 extends to the position of the trailing edge 430b of the first strut 430 in the direction of the axis Am, it is possible to maintain the longitudinal vortex V30 formed by the convex guide portion 520 on the downstream side along the convex guide portion 520 and to regulate the disturbance of the longitudinal vortex V30.

The present invention is not limited to the constitutions of the above-described embodiments, and the design can be changed without departing from the gist thereof.

For example, in the above-described fourth and fifth embodiments, the case in which each of the guide plate 510 and the convex guide portion 520 is in the form of a plate has been described. However, the present invention is not limited to the plate shape and may have, for example, a blade profile, or may be formed to be tapered outward in the radial direction of the axis Am.

Further, the case in which the guide plate 510 and the convex guide portion 520 are formed such that the protruding amount gradually increases from one side (the upstream side) in the direction of the axis Am toward the other side (the downstream side) has been described. However, the present invention is not limited to this shape. For example, the protruding amount may be uniform from the upstream side to the downstream side.

Further, in each of the above-described embodiments, the case in which the convex portion 500, the guide plate 510, and the convex guide portion 520 are formed one by one between the adjacent first struts 430 in the circumferential direction has been described. However, two or more convex portions 500, guide plates 510 and convex guide portion 520 may be formed between the adjacent first struts 430 in the circumferential direction.

Further, in the third embodiment, the case in which the plurality of convex portions 500 provided in one diffuser 40A have the same constitution has been described. However, the plurality of convex portions 500 may have different constitutions (shapes, arrangements, or the like). For example, the position, the length, the height, and the width of the convex portion 500 may be different for each of the plurality of convex portions 500. Similarly, the plurality of guide plates 510 according to the fourth embodiment and the plurality of convex guide portions 520 according to the fifth embodiment provided in one diffuser may have different constitutions (shapes, arrangements, or the like).

INDUSTRIAL APPLICABILITY

According to the turbine and the gas turbine, it is possible to improve the performance by minimizing the pressure loss.

REFERENCE SIGNS LIST

1, 10 Compressor
2, 20A, 20B, 20C Turbine
3, 30 Combustor
4A, 4B, 40A, 40B, 40C Diffuser
11, 110 Compressor rotor
12, 120 Compressor casing
13, 130 Compressor blade stage
14, 140 Compressor blade
15, 150 Compressor vane stage
16, 160 Compressor vane
21, 210 Turbine rotor
22, 220 Turbine casing
23, 230 Turbine blade stage
24, 240 Turbine blade
25, 250 Turbine vane stage
26, 260 Turbine vane
300 Bearing device
310 Bearing
320 Bearing housing
41, 410 Combustor basket
41A, 410A Outer circumferential surface
42, 420 Outer shell
42A, 420A Inner circumferential surface
43A, 43B, 430 First strut (strut)
43a, 430a Leading edge
43b, 430b Trailing edge
44, 440 Second strut
450 Strut cover
50 Protrusion
51 Front end
52 Rear end
53, 500 Convex portion
510 Guide plate
520 Convex guide portion
91, 910 Gas turbine rotor
91A, 910A Shaft end
92, 920 Gas turbine casing
100A, 100B, 1000 Gas turbine
Am Axis
C Exhaust flow path
G Generator
S1 Pressure side
S2 Suction side
V1, V10 Horseshoe vortex
V2 Separation vortex
V3 Longitudinal vortex
V4, V30 Longitudinal vortex
V20 Vortex

The invention claimed is:
1. A turbine comprising:
a turbine rotor which extends along an axis and is rotatable in a circumferential direction;
a turbine casing which covers the turbine rotor from an outer circumferential side thereof;
a plurality of turbine blades positioned on an outer circumferential surface of the turbine rotor in the circumferential direction;
a plurality of turbine vanes positioned on an inner circumferential surface of the turbine casing so as to be adjacent to the turbine blades in an axial direction and arranged in the circumferential direction; and
a diffuser which is downstream of the turbine blades in the axial direction and defines an exhaust flow path through which an exhaust gas is to flow,
wherein:
the diffuser comprises a combustor basket which extends along the axis, an outer shell which covers the combustor basket from the outer circumferential side and defines the exhaust flow path between the combustor basket and the outer shell, a plurality of struts positioned in the exhaust flow path at intervals in the circumferential direction, the struts connecting the combustor basket to the outer shell and being positioned at a front side in a rotation direction of the turbine rotor from an inner side toward an outer side in a radial direction, and a protrusion which is between an adjacent pair of the struts in the circumferential direction, protrudes from an outer circumferential surface of the combustor basket and extends in the axial direction;
a front end of the protrusion is between a leading edge position of the adjacent pair of the struts and a trailing edge position of the adjacent pair of the struts; and
a rear end of the protrusion extends to an aft end of the combustor basket.

2. The turbine according to claim 1, wherein the protrusion is tapered toward the front end and tapered toward the rear end when seen from the outer side in the radial direction.

3. The turbine according to claim 1, further comprising a convex portion which protrudes from a suction side of one of the adjacent pair of the struts.

4. The turbine according to claim 3, wherein the convex portion is closer to the combustor basket in the radial direction than a center of the one of the adjacent pair of the struts.

5. A gas turbine comprising:
a compressor;
a combustor; and
the turbine according to claim 1,
wherein:
the compressor is configured to generate compressed air;
the combustor is configured to mix a fuel with the compressed air and generate a combustion gas; and
the turbine is configured to be driven by the combustion gas.

6. A turbine comprising:
a turbine rotor which extends along an axis and is rotatable in a circumferential direction;
a turbine casing which covers the turbine rotor from an outer circumferential side thereof;
a plurality of turbine blades positioned on an outer circumferential surface of the turbine rotor in the circumferential direction;
a plurality of turbine vanes positioned on an inner circumferential surface of the turbine casing so as to be adjacent to the turbine blades in an axial direction and arranged in the circumferential direction; and
a diffuser which is downstream of the turbine blades in the axial direction and defines an exhaust flow path through which an exhaust gas is to flow,
wherein:
the diffuser comprises a combustor basket which extends along the axis, an outer shell which covers the combustor basket from the outer circumferential side and defines the exhaust flow path between the combustor basket and the outer shell, a plurality of struts positioned in the exhaust flow path at intervals in the circumferential direction, the struts connecting the combustor basket to the outer shell and being positioned at a front side in a rotation direction of the turbine rotor from an inner side toward an outer side in a radial direction, and a protrusion which is between an adjacent pair of the struts in the circumferential direction, protrudes from an outer circumferential surface of the combustor basket and extends in the axial direction;
a front end of the protrusion is between a leading edge position of the adjacent pair of the struts and a trailing edge position of the adjacent pair of the struts; and
a rear end of the protrusion extends further than the trailing edge position of the adjacent pair of the struts in the axial direction; and
a height of the protrusion is 3% to 1% of a profile height of one of the adjacent pair of the struts.

\* \* \* \* \*